United States Patent
Zhang et al.

(10) Patent No.: US 11,637,599 B2
(45) Date of Patent: Apr. 25, 2023

(54) PRECODING MATRIX INDICATION METHOD, COMMUNICATIONS APPARATUS, AND STORAGE MEDIUM

(71) Applicant: HUAWEI TECHNOLOGIES CO., LTD., Guangdong (CN)

(72) Inventors: Ruiqi Zhang, Beijing (CN); Xueru Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/512,641

(22) Filed: Oct. 27, 2021

(65) Prior Publication Data
US 2022/0052729 A1 Feb. 17, 2022

Related U.S. Application Data

(63) Continuation of application No. 17/214,175, filed on Mar. 26, 2021, now Pat. No. 11,196,466, which is a
(Continued)

(51) Int. Cl.
*H04B 7/02* (2018.01)
*H04B 7/0456* (2017.01)

(52) U.S. Cl.
CPC ................... *H04B 7/0456* (2013.01)

(58) Field of Classification Search
CPC .. H04B 7/0486; H04B 7/0413; H04B 7/0626; H04B 7/0639
(Continued)

(56) References Cited

U.S. PATENT DOCUMENTS

2011/0122968 A1* 5/2011 Jongren ............... H04B 7/0639
375/296
2012/0082102 A1 4/2012 Kang et al.
(Continued)

FOREIGN PATENT DOCUMENTS

| CN | 105164933 | 12/2015 |
| CN | 105721032 | 6/2016 |

(Continued)

OTHER PUBLICATIONS

3GPP TS 38.214 V15.2 0 (Jun. 2018), 3rd Generation Partnership Project; Technical Specification Group Radio Access Network; NR; Physical layer procedures for data (Release 15), Jun. 2018, 95 pages.
(Continued)

*Primary Examiner* — Zewdu A Kassa
(74) *Attorney, Agent, or Firm* — Fish & Richardson P.C.

(57) ABSTRACT

Embodiments of this application provide a precoding matrix indication method, a communications apparatus, and a storage medium. A precoding matrix of each of K frequency-domain units satisfies $W = W_1 \times W_2$, and elements in $W_2$ in the K frequency-domain units are represented by P elements that are relatively few. A terminal device reports third indication information, where the third indication information includes first indication information and the second indication information, and the first indication information and the second indication information are independently encoded. The first indication information is used to indicate the P elements, and the second indication information is used to indicate P. Therefore, the terminal device can adjust a quantity of information bits of the second indication information based on a channel condition change, thereby improving precoding matrix reporting efficiency.

20 Claims, 8 Drawing Sheets

Related U.S. Application Data continuation of application No. PCT/CN2018/108480, filed on Sep. 28, 2018.

(58) Field of Classification Search
USPC ............... 375/267, 260, 259, 316, 219, 295
See application file for complete search history.

(56) References Cited

U.S. PATENT DOCUMENTS

| | | | |
|---|---|---|---|
| 2012/0147933 A1* | 6/2012 | Li | H04L 1/20 375/219 |
| 2015/0189644 A1 | 7/2015 | Hernando | |

FOREIGN PATENT DOCUMENTS

| | | |
|---|---|---|
| WO | 2017152785 | 9/2017 |
| WO | 2018033207 | 2/2018 |
| WO | 2018111007 | 6/2018 |

OTHER PUBLICATIONS

Extended European Search Report issued in European Application No. 18935614.0 dated Aug. 5, 2021, 5 pages.

Huawei, HiSilicon, "Design for Type II Feedback," 3GPP TSG RAN WG1 Meeting #88bis, R1-1705076, Spokane, USA, Apr. 3-7, 2017, 11 pages.

Huawei, HiSilicon, "Enhancements on CSI reporting and codebook design," 3GPP TSG RAN WG1 Meeting #94, R1-1808949, Gothenburg, Sweden, Aug. 20-24, 2018, 7 pages.

Office Action issued in Chinese Application No. 201880097614.2 dated Sep. 28, 2021, 6 pages.

PCT International Search Report and Written Opinion issued in International Application No. PCT/CN2018/108480 dated Mar. 28, 2019, 19 pages (with English translation).

Samsung, Type II CSI reporting. 3GPP TSG RAN WG1 Meeting #88bis, Spokane, USA Apr. 3-7, 2017, R1-1705349, 11 pages.

\* cited by examiner

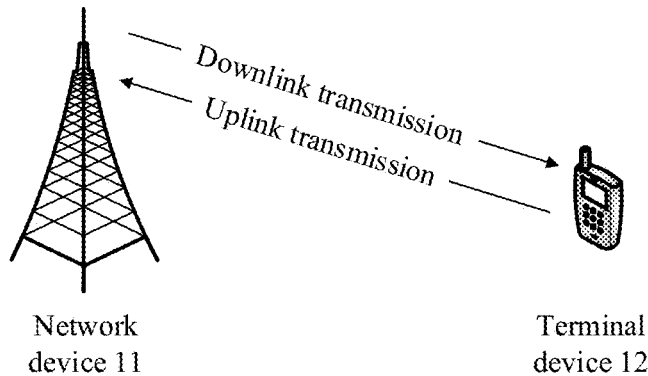

Network　　　　　　　　　Terminal
device 11　　　　　　　　device 12

FIG. 1

A terminal device generates third indication information, where
the third indication information is used to indicate $W_2^{(1)}, W_2^{(2)}, \ldots,$
and $W_2^{(k)}$, where
$W^{(k)}$ is a precoding matrix in a $k^{th}$ frequency-domain unit,
$W^{(k)}$ satisfies $W^{(k)} = W_1 \times W_2^{(k)}$, $W_1$ is a $W_t \times R$ matrix,
$W_2^{(k)}$ is an $L \times R$ matrix, $0 < k \leq K$, and $K$ is a quantity of
frequency-domain units;
the third indication information includes second indication
information and first indication information;
the second indication information is used to indicate $P_{i,j}$ elements in
a vector $D_{i,j}$, where
the vector $D_{i,j}$ and a matrix $F_{i,j}$ satisfy $V_{i,j} = F_{i,j} \times D_{i,j}$,
the vector $V_{i,j}$ corresponds to $W_2^{(1)}, W_2^{(2)}, \ldots,$ and $W_2^{(k)}$, and
$F_{i,j}$ is a $K \times P_{i,j}$ matrix; where
$0 < i \leq L$, $0 < j \leq R$, and $P_{i,j} < K$; and
the first indication information is used to indicate a quantity of the
elements indicated by the second indication information

— S202

The terminal device sends the third indication information

PRECODING MATRIX INDICATION METHOD, COMMUNICATIONS APPARATUS, AND STORAGE MEDIUM

CROSS-REFERENCE TO RELATED APPLICATIONS

This application is a continuation of U.S. patent application Ser. No. 17/214,175, filed on Mar. 26, 2021, which is a continuation of International Application No. PCT/CN2018/108480, filed on Sep. 28, 2018. All of the aforementioned patent applications are hereby incorporated by reference in their entireties.

TECHNICAL FIELD

This application relates to the field of communications technologies, and in particular, to a precoding matrix indication method, a communications apparatus, and a storage medium.

BACKGROUND

In a long term evolution (LTE) system, a base station device receives channel state information (CSI) reported by a terminal device. The CSI includes a precoding matrix indicator PMI, and the PMI is used to indicate, to the base station device, a channel precoding matrix (PM) selected by the terminal device. The base station device generates a precoding matrix according to the PMI, and sends downlink data on an antenna of the base station device by using the precoding matrix.

The terminal device reports the CSI to the base station device, where the CSI is divided into two parts: a first part, part 1 CSI and a second part, part 2 CSI. The part 1 CSI includes a rank indicator (RI), a channel quality indicator (CQI) of a first codeword, and a quantity of non-zero wideband amplitude coefficients in $W_2$. The part 2 CSI is used to report indication information of $W_1$, and sub-band amplitudes corresponding to a wideband amplitude and a non-zero wideband amplitude in $W_2$, and a sub-band phase corresponding to the non-zero wideband amplitude in $W_2$. In addition, the part 1 CSI and the part 2 CSI are independently encoded. In the CSI reported by the terminal device, a quantity of bits in the part 1 CSI is fixed, a quantity of bits in the part 2 CSI is variable, and the quantity of bits in the part 2 CSI can be determined based on the RI and the quantity of non-zero wideband amplitude coefficients in $W_2$ in the part 1 CSI. A base station may demodulate information bits of the part 2 CSI based on information in the part 1 CSI.

However, in a CSI compression technology, the terminal device performs reporting after performing secondary filtering on coefficients in each $W_2$. Therefore, through an existing CSI reporting manner, the quantity of bits in the part 2 CSI cannot be determined based on the quantity of non-zero wideband amplitude coefficients in $W_2$ reported in the part 1 CSI, so that the base station cannot demodulate the information bits of the part 2 CSI based on the information in the part 1 CSI, thereby affecting data transmission.

SUMMARY

This application provides a precoding matrix indication method, a communications apparatus, and a storage medium, to report necessary demodulation information in a precoding matrix to avoid abnormal data transmission.

According to a first aspect, this application provides a precoding matrix indication method. The method includes: A terminal device generates third indication information, where the third indication information is used to indicate $W_2^{(1)}, W_2^{(2)}, \ldots,$ and $W_2^{(K)}$, where $W^{(k)}$ is a precoding matrix in a $k^{th}$ frequency-domain unit, $W^{(k)}$ satisfies $W^{(k)}=W_1 \times W_2^{(k)}$, $W_1$ is an $N_t \times L$ matrix, $W_2^{(k)}$ is an $L \times R$ matrix, $0 < k \leq K$, and K is a quantity of frequency-domain units; the third indication information includes second indication information and first indication information; the second indication information is used to indicate $P_{i,j}$ elements in a vector $D_{i,j}$, where the vector $D_{i,j}$ and a matrix $F_{i,j}$ satisfy $V_{i,j}=F_{i,j} \times D_{i,j}$, the vector $V_{i,j}$ corresponds to $W_2^{(1)}(i,j), W_2^{(2)}(i,j), \ldots,$ and $W_2^{(K)}(i,j)$, $W_2^{(k)}(i,j)$ is a complex number in an $i^{th}$ row and a $j^{th}$ column of the matrix $W_2^{(k)}$, and $F_{i,j}$ is a $K \times P_{i,j}$ matrix, where $0 < i \leq L$, $0 < j \leq R$, and $P_{i,j} < K$; and the first indication information is used to indicate a quantity of the elements indicated by the second indication information; and the terminal device sends the third indication information.

According to the solution provided in this embodiment, a quantity of elements reported in the precoding matrix is reported, so that a network device that receives the third indication information can decode CSI based on the information, and the terminal device can dynamically adjust the quantity of the reported elements based on a channel condition. This reduces resource overheads required for CSI reporting.

In a possible design, that the vector $V_{i,j}$ corresponds to $W_2^{(1)}(i,j), W_2^{(2)}(i,j), \ldots,$ and $W_2^{(K)}(i,j)$ includes: $V_{i,j}$ is a column vector including $W_2^{(1)}(i,j), W_2^{(2)}(i,j), \ldots,$ and $W_2^{(K)}(i,j)$; or $V_{i,j}$ is a column vector including amplitudes of $W_2^{(1)}(i,j), W_2^{(2)}(i,j), \ldots,$ and $W_2^{(K)}(i,j)$; or $V_{i,j}$ is a column vector including phases of $W_2^{(1)}(i,j), W_2^{(2)}(i,j), \ldots,$ and $W_2^{(K)}(i,j)$. The vector $V_{i,j}$ may be represented as $V_{i,j}=[\alpha_{i,j}^1 \ldots \alpha_{i,j}^K]^T$, where $\alpha_{i,j}^k$ is $W_2^{(k)}(i,j)$, or an amplitude of $W_2^{(k)}(i,j)$, or a phase of $W_2^{(k)}(i,j)$.

In a possible design, the quantity of the elements indicated by the second indication information includes $P_{i,j}$ or $P_{i,j}-1$, and $(i,j) \in S$, where S is a nonempty subset of a set $\{(x,y)|(x \in \{1,2,\ldots,L\}, y \in \{1,2,\ldots,R\})\}$.

The set S represents value ranges of i and j in the vector $D_{i,j}$ that needs to be reported by the terminal device. It should be noted that each matrix of the matrices $W_2^{(1)}, W_2^{(2)}, \ldots,$ and $W_2^{(K)}$ is a matrix with L rows and R columns. However, in the K L×R matrices, amplitudes of some elements are 0, and the terminal device may not report $D_{i,j}$ corresponding to the element whose amplitude is 0. Therefore, values of i and j are a nonempty subset of the set $\{(x,y)|(x \in \{1,2,\ldots,L\}, y \in \{1,2,\ldots,R\})\}$. A value set of (x,y) in $\{(x,y)|(x \in \{1,2,\ldots,L\}, y \in \{1,2,\ldots,R\})\}$ is (1,1), (1,2), $\ldots,$ (1,R), (2,1), (2,2), $\ldots,$ (2,R), $\ldots,$ (L,1), (L,2), $\ldots,$ and (L,R).

According to the solution provided in this embodiment, a quantity of elements in each vector $D_{i,j}$ is reported, so that the quantity of the reported elements in the precoding matrix is indicated, thereby avoiding abnormal data transmission.

In a possible design, the quantity of the elements indicated by the second indication information includes: $\Sigma_{(i,j) \in S} P_{i,j}$ or $\Sigma_{(i,j) \in S}(P_{i,j}-1)$, where S is a nonempty subset of a set $\{(x,y)|(x \in \{1,2,\ldots,L\}, y \in \{1,2,\ldots,R\})\}$.

The meaning of the set $\{(x,y)|(x \in \{1,2,\ldots,L\}, y \in \{1,2,\ldots,R\})\}$ is described in the foregoing paragraph. According to the solution provided in this embodiment, a total quantity of the reported elements in the precoding matrix is directly indicated, so that an amount of data reported by the terminal device can be reduced on a basis that the network device can demodulate the CSI.

In a possible design, the quantity of the elements indicated by the second indication information includes $P_q$, where $P_q$ is a sum of the quantity $P_{i,j}$ of the elements when j=q is given: $P_q = \Sigma_{j=q\ and\ (i,j) \in S} P_{i,j}$ or $P_q = \Sigma_{j=q\ and\ (i,j) \in S} (P_{i,j}-1)$, and S is a nonempty subset of a set $\{(x,y)|(x \in \{1,2, \ldots, L\}, y \in \{1,2, \ldots, R\})\}$.

The meaning of the set $\{(x,y)|(x \in \{1,2, \ldots, L\}, y \in \{1,2, \ldots, R\})\}$ is described in the foregoing paragraph. In the solution provided in this embodiment, each j corresponds to a layer of the precoding matrix, so that the solution is used by the terminal device to report a quantity of reported elements corresponding to each layer. This hierarchical reporting manner helps improve a CSI demodulation rate of the network device.

In a possible design, the $P_{i,j}$ elements in the vector $D_{i,j}$ are $P_{i,j}$ elements in $W_2^{(1)}(i,j), W_2^{(2)}(i,j), \ldots,$ and $W_2^{(K)}(i,j)$, and the matrix $F_{i,j}$ is used to obtain $W_2^{(1)}(i,j), W_2^{(2)}(i,j), \ldots,$ and $W_2^{(K)}(i,j)$ based on the $P_{i,j}$ elements in the vector $D_{i,j}$; or the $P_{i,j}$ elements in the vector $D_{i,j}$ are phases of $P_{i,j}$ elements in $W_2^{(1)}(i,j), W_2^{(2)}(i,j), \ldots,$ and $W_2^{(K)}(i,j)$, and the matrix $F_{i,j}$ is used to obtain the phases of $W_2^{(1)}(i,j), W_2^{(2)}(i,j), \ldots,$ and $W_2^{(K)}(i,j)$ based on the $P_{i,j}$ elements in the vector $D_{i,j}$; or the $P_{i,j}$ elements in the vector $D_{i,j}$ are amplitudes of $P_{i,j}$ elements in $W_2^{(1)}(i,j), W_2^{(2)}(i,j), \ldots,$ and $W_2^{(K)}(i,j)$, and the matrix $F_{i,j}$ is used to obtain the amplitudes of $W_2^{(1)}(i,j), W_2^{(2)}(i,j), \ldots,$ and $W_2^{(K)}(i,j)$ based on the $P_{i,j}$ elements in the vector $D_{i,j}$.

In this case, the method further includes: The terminal device sends fourth indication information, where the fourth indication information is used to indicate frequency-domain positions of the $P_{i,j}$ elements in $W_2^{(1)}(i,j), W_2^{(2)}(i,j), \ldots,$ and $W_2^{(K)}(i,j)$ that correspond to the $P_{i,j}$ elements in the vector $D_{i,j}$.

According to the solution provided in this embodiment, not all coefficients in $W_2^{(k)}$ need to be reported, and only an element at an inflection point that can represent a frequency-domain position of $W_2^{(k)}$ needs to be reported, thereby greatly reducing an amount of data reported by the terminal device.

In another possible design, $P_{i,j}$ vectors of the matrix $F_{i,j}$ are orthogonal to each other.

In this case, the method further includes: The terminal device sends fifth indication information, where the fifth indication information is used to indicate the matrix $F_{i,j}$.

According to the solution provided in this embodiment, matrix transformation may be performed on coefficients in frequency domain, and a limited quantity of sample points with a relatively large value are selected, from results obtained after the matrix transformation, for reporting. In this way, the amount of data reported by the terminal device is reduced.

In another possible design, the method further includes: The terminal device sends sixth indication information, where the sixth indication information is used to indicate a quantity of the vectors $D_{i,j}$, where (i,j)∈S or (i,j)∈S and j=q are satisfied, and S is a nonempty subset of the set $\{(x,y)|(x \in \{1,2, \ldots, L\}, y \in \{1,2, \ldots, R\})\}$. The meaning of the set $\{(x,y)|(x \in \{1,2, \ldots, L\}, y \in \{1,2, \ldots, R\})\}$ is described in the foregoing paragraph.

In another possible design, the first indication information includes one or more bitmaps; and each bitmap is used to indicate positions of the $P_{i,j}$ elements in the vector $D_{i,j}$.

In this embodiment, the first indication information includes one bitmap, so that the bitmap is used to indicate position information of elements in all reported vectors $D_{i,j}$ in K positions. Alternatively, the first indication information includes R bitmaps, and the bitmaps are used to indicate position information, in K positions, of elements in vectors $D_{i,j}$ whose value of j is 1, 2, . . . , or R in all reported vectors $D_{i,j}$. Alternatively, the first indication information includes L×R or (L−1)×R bitmaps, and the bitmaps are used to indicate position information, in K positions, of an element that is in $D_{i,j}$ and that corresponds to each element in $W_2$ or each element other than an element corresponding to a largest amplitude in each column of $W_2$.

According to the solution provided in this embodiment, when the quantity of the reported elements is indicated, a position of the reported element may be indicated, and the position of the reported element does not need to be indicated in another manner. This manner has relatively high flexibility and scalability.

In another possible design, the third indication information is channel state information CSI, and the CSI includes: a first part, part 1 CSI, including the first indication information, a rank indicator RI, and a channel quality indicator CQI that corresponds to a first codeword; and a second part, part 2 CSI, including the second indication information, where the part 1 CSI and the part 2 CSI are independently encoded. In this way, the part 1 CSI may indicate a quantity of bits in the part 2 CSI, so that the network device that receives the third indication information can decode the CSI based on the information, thereby avoiding abnormal data transmission.

According to a second aspect, this application provides a precoding matrix indication method. The method includes: A network device receives third indication information, where the third indication information is used to indicate $W_2^{(1)}, W_2^{(2)}, \ldots,$ and $W_2^{(K)}$, where $W^{(k)}$ is a precoding matrix in a $k^{th}$ frequency-domain unit, $W^{(k)}$ satisfies $W^{(k)} = W_1 \times W_2^{(k)}$, $W_1$ is an $N_t \times L$ matrix, $W_2^{(k)}$ is an L×R matrix, 0<k≤K, and K is a quantity of frequency-domain units; the third indication information includes second indication information and first indication information; the second indication information is used to indicate $P_{i,j}$ elements in a vector $D_{i,j}$, where the vector $D_{i,j}$ and a matrix $F_{i,j}$ satisfy $V_{i,j} = F_{i,j} \times D_{i,j}$, the vector $V_{i,j}$ corresponds to $W_2^{(1)}(i,j), W_2^{(2)}(i,j), \ldots,$ and $W_2^{(K)}(i,j)$ $W_2^{(k)}(i,j)$ is a complex number in an $i^{th}$ row and a $j^{th}$ column of the matrix $W_2^{(k)}$, and $F_{i,j}$ is a $K \times P_{i,j}$ matrix, where 0<i≤L, 0<j≤R, and $P_{i,j}$<K; and the first indication information is used to indicate a quantity of the elements indicated by the second indication information; and the network device sends downlink data based on the third indication information.

According to the solution provided in this embodiment, a quantity of elements reported in the precoding matrix is reported, so that the network device that receives the third indication information can decode CSI based on the information, and a terminal device can dynamically adjust the quantity of the reported elements based on a channel condition. This reduces resource overheads required for CSI reporting.

In a possible design, that the vector $V_{i,j}$ corresponds to $W_2^{(1)}(i,j), W_2^{(2)}(i,j), \ldots,$ and $W_2^{(K)}(i,j)$ includes: $V_{i,j}$ is a column vector including $W_2^{(1)}(i,j), W_2^{(2)}(i,j), \ldots,$ and $W_2^{(K)}(i,j)$; or $V_{i,j}$ is a column vector including amplitudes of $W_2^{(1)}(i,j), W_2^{(2)}(i,j), \ldots$ and $W_2^{(K)}(i,j)$; or $V_{i,j}$ is a column vector including phases of $W_2^{(1)}(i,j), W_2^{(2)}(i,j), \ldots,$ and $W_2^{(K)}(i,j)$. The vector $V_{i,j}$ may be represented as $V_{i,j} = [\alpha_{i,j}^1 \ldots \alpha_{i,j}^K]^T$, where $\alpha_{i,j}^k$ is $W_2^{(k)}(i,j)$, or an amplitude of $W_2^{(k)}(i,j)$, or a phase of $W_2^{(k)}(i,j)$.

In a possible design, the quantity of the elements indicated by the second indication information includes $P_{i,j}$ or $P_{i,j}-1$, and $(i,j) \in S$, where S is a nonempty subset of a set $\{(x,y)| (x \in \{1,2,\ldots,L\}, y \in \{1,2,\ldots,R\})\}$.

The set S represents value ranges of i and j in the vector $D_{i,j}$ that needs to be reported by the terminal device. It should be noted that each matrix of the matrices $W_2^{(1)}$, $W_2^{(2)}$, ..., and $W_2^{(K)}$ is a matrix with L rows and R columns. However, in the K L×R matrices, amplitudes of some elements are 0, and the terminal device may not report $D_{i,j}$ corresponding to the element whose amplitude is 0. Therefore, values of i and j are a nonempty subset of the set $\{(x,y)|(x \in \{1,2,\ldots,L\}, y \in \{1,2,\ldots,R\})\}$. A value set of $(x,y)$ in $\{(x,y)|(x \in \{1,2,\ldots,L\}, y \in \{1,2,\ldots,R\})\}$ is $(1,1)$, $(1,2)$, ..., $(1,R)$, $(2,1)$, $(2,2)$, ..., $(2,R)$, ..., $(L,1)$, $(L,2)$, ..., and $(L,R)$.

According to the solution provided in this embodiment, a quantity of elements in each vector $D_{i,j}$ is reported, so that the quantity of the reported elements in the precoding matrix is indicated, thereby avoiding abnormal data transmission.

In a possible design, the quantity of the elements indicated by the second indication information includes: $\Sigma_{(i,j) \in S} P_{i,j}$ or $\Sigma_{(i,j) \in S}(P_{i,j}-1)$, where S is a nonempty subset of a set $\{(x,y)|(x \in \{1,2,\ldots,L\}, y \in \{1,2,\ldots,R\})\}$.

The meaning of the set $\{(x,y)|(x \in \{1,2,\ldots,L\}, y \in \{1,2,\ldots,R\})\}$ is described in the foregoing paragraph. According to the solution provided in this embodiment, a total quantity of the reported elements in the precoding matrix is directly indicated, so that an amount of data reported by the terminal device can be reduced on a basis that the network device can demodulate the CSI.

In a possible design, the quantity of the elements indicated by the second indication information includes $P_q$, where $P_q$ is a sum of the quantity $P_{i,j}$ of the elements when j=q is given: $P_q = \Sigma_{j=q \text{ and } (i,j) \in S} P_{i,j}$ or $P_q = \Sigma_{j=q \text{ and } (i,j) \in S}(P_{i,j}-1)$, and S is a nonempty subset of a set $\{(x,y)|(x \in \{1,2,\ldots,L\}, y \in \{1,2,\ldots,R\})\}$.

The meaning of the set $\{(x,y)|(x \in \{1,2,\ldots,L\}, y \in \{1,2,\ldots,R\})\}$ is described in the foregoing paragraph. In the solution provided in this embodiment, each j corresponds to a layer of the precoding matrix, so that the solution is used by the terminal device to report a quantity of reported elements corresponding to each layer. This hierarchical reporting manner helps improve a CSI demodulation rate of the network device.

In a possible design, the $P_{i,j}$ elements in the vector $D_{i,j}$ are $P_{i,j}$ elements in $W_2^{(1)}(i,j), W_2^{(2)}(i,j), \ldots$, and $W_2^{(K)}(i,j)$, and the matrix $F_{i,j}$ is used to obtain $W_2^{(1)}(i,j), W_2^{(2)}(i,j), \ldots$, and $W_2^{(K)}(i,j)$ based on the $P_{i,j}$ elements in the vector $D_{i,j}$; or the $P_{i,j}$ elements in the vector $D_{i,j}$ are phases of $P_{i,j}$ elements in $W_2^{(1)}(i,j), W_2^{(2)}(i,j), \ldots$, and $W_2^{(K)}(i,j)$, and the matrix $F_{i,j}$ is used to obtain the phases of $W_2^{(1)}(i,j), W_2^{(2)}(i,j), \ldots$, and $W_2^{(K)}(i,j)$ based on the $P_{i,j}$ elements in the vector $D_{i,j}$; or the $P_{i,j}$ elements in the vector $D_{i,j}$ are amplitudes of $P_{i,j}$ elements in $W_2^{(1)}(i,j), W_2^{(2)}(i,j), \ldots$, and $W_2^{(K)}(i,j)$, and the matrix $F_{i,j}$ is used to obtain the amplitudes of $W_2^{(1)}(i,j), W_2^{(2)}(i,j), \ldots$, and $W_2^{(K)}(i,j)$ based on the $P_{i,j}$ elements in the vector $D_{i,j}$.

In this case, the method further includes: The network device receives fourth indication information, where the fourth indication information is used to indicate frequency-domain positions of the $P_{i,j}$ elements in $W_2^{(1)}(i,j), W_2^{(2)}(i,j), \ldots$, and $W_2^{(K)}(i,j)$ that correspond to the $P_{i,j}$ elements in the vector $D_{i,j}$.

According to the solution provided in this embodiment, not all coefficients in $W_2^{(k)}$ need to be reported, and only an element at an inflection point that can represent a frequency-domain position of $W_2^{(k)}$ needs to be reported, thereby greatly reducing an amount of data reported by the terminal device.

In another possible design, $P_{i,j}$ vectors of the matrix $F_{i,j}$ are orthogonal to each other.

In this case, the method further includes: The network device receives fifth indication information, where the fifth indication information is used to indicate the matrix $F_{i,j}$.

According to the solution provided in this embodiment, matrix transformation may be performed on coefficients in frequency domain, and a limited quantity of sample points with a relatively large value are selected, from results obtained after the matrix transformation, for reporting. In this way, the amount of data reported by the terminal device is reduced.

In another possible design, the method further includes: The network device receives sixth indication information, where the sixth indication information is used to indicate a quantity of the vectors $D_{i,j}$, where $(i,j) \in S$ or $(i,j) \in S$ and j=q are satisfied, and S is a nonempty subset of the set $\{(x,y)|(x \in \{1,2,\ldots,L\}, y \in \{1,2,\ldots,R\})\}$. The meaning of the set $\{(x,y)|(x \in \{1,2,\ldots,L\}, y \in \{1,2,\ldots,R\})\}$ is described in the foregoing paragraph.

In another possible design, the first indication information includes one or more bitmaps; and each bitmap is used to indicate positions of the $P_{i,j}$ elements in the vector $D_{i,j}$.

In this embodiment, the first indication information includes one bitmap, so that the bitmap is used to indicate position information of elements in all reported vectors $D_{i,j}$ in K positions. Alternatively, the first indication information includes R bitmaps, and the bitmaps are used to indicate position information, in K positions, of elements in vectors $D_{i,j}$ whose value of j is 1,2, ..., or R in all reported vectors $D_{i,j}$. Alternatively, the first indication information includes L×R or (L−1)×R bitmaps, and the bitmaps are used to indicate position information, in K positions, of an element that is in $D_{i,j}$ and that corresponds to each element in $W_2$ or each element other than an element corresponding to a largest amplitude in each column of $W_2$.

According to the solution provided in this embodiment, when the quantity of the reported elements is indicated, a position of the reported element may be indicated, and the position of the reported element does not need to be indicated in another manner. This manner has relatively high flexibility and scalability.

In another possible design, the third indication information is channel state information CSI, and the CSI includes: a first part, part 1 CSI, including the first indication information, a rank indicator RI, and a channel quality indicator CQI that corresponds to a first codeword; and a second part, part 2 CSI, including the second indication information, where the part 1 CSI and the part 2 CSI are independently encoded. In this way, the part 1 CSI may indicate a quantity of bits in the part 2 CSI, so that the network device that receives the third indication information can decode the CSI based on the information, thereby avoiding abnormal data transmission.

According to a third aspect, this application provides a communications apparatus, including a processing module and a sending module. The processing module is configured to generate third indication information, where the third indication information is used to indicate $W_2^{(1)}$, $W_2^{(2)}$, ..., and $W_2^{(K)}$ where $W^{(k)}$ is a precoding matrix in a $k^{th}$ frequency-domain unit, $W^{(k)}$ satisfies $W^{(k)}=W_1 \times W_2^{(k)}$, $W_1$ is an $N_t \times L$ matrix, $W_2^{(k)}$ is an L×R matrix, $0 < k \leq K$, and K is a quantity of frequency-domain units; the third indication information includes second indication information and first indication information; the second indication information is used to indicate $P_{i,j}$ elements in a vector $D_{i,j}$, where the vector $D_{i,j}$ and a matrix $F_{i,j}$ satisfy $V_{i,j}=F_{i,j} \times D_{i,j}$, the vector $V_{i,j}$ corresponds to $W_2^{(1)}(i,j)$, $W_2^{(2)}(i,j)$, ..., and $W_2^{(K)}(i,j)$, $W_2^{(k)}(i,j)$ is a complex number in an $i^{th}$ row and a $j^{th}$ column of the matrix $W_2^{(k)}$, and $F_{i,j}$ is a $K \times P_{i,j}$ matrix, where $0 < i \le L$, $0 < j \le R$, and $P_{i,j} < K$; and the first indication information is used to indicate a quantity of the elements indicated by the second indication information; and the sending module is configured to send the third indication information.

According to the solution provided in this embodiment, a quantity of elements reported in the precoding matrix is reported, so that a network device that receives the third indication information can decode CSI based on the information, and a terminal device can dynamically adjust the quantity of the reported elements based on a channel condition. This reduces resource overheads required for CSI reporting.

In a possible design, that the vector $V_{i,j}$ corresponds to $W_2^{(1)}(i,j)$, $W_2^{(2)}(i,j)$ ..., and $W_2^{(K)}(i,j)$ includes: $V_{i,j}$ is a column vector including $W_2^{(1)}(i,j)$, $W_2^{(2)}(i,j)$, ..., and $W_2^{(K)}(i,j)$; or $V_{i,j}$ is a column vector including amplitudes of $W_2^{(1)}(i,j)$, $W_2^{(2)}(i,j)$, and $W_2^{(K)}(i,j)$; or $V_{i,j}$ is a column vector including phases of $W_2^{(1)}(i,j)$, $W_2^{(2)}(i,j)$, ..., and $W_2^{(K)}(i,j)$. The vector $V_{i,j}$ may be represented as $V_{i,j}=[\alpha_{i,j}^1 \ldots \alpha_{i,j}^K]^T$, where $\alpha_{i,j}^k$ is $W_2^{(k)}(i,j)$, or an amplitude of $W_2^{(k)}(i,j)$, or a phase of $W_2^{(k)}(i,j)$.

In a possible design, the quantity of the elements indicated by the second indication information includes $P_{i,j}$ or $P_{i,j}-1$, and $(i,j) \in S$, where S is a nonempty subset of a set $\{(x,y)|(x \in \{1,2,\ldots,L\}, y \in \{1,2,\ldots,R\})\}$.

The set S represents value ranges of i and j in the vector $D_{i,j}$ that needs to be reported by the terminal device. It should be noted that each matrix of the matrices $W_2^{(1)}$, $W_2^{(2)}$, ..., and $W_2^{(K)}$ is a matrix with L rows and R columns. However, in the K L×R matrices, amplitudes of some elements are 0, and the terminal device may not report $D_{i,j}$ corresponding to the element whose amplitude is 0. Therefore, values of i and j are a nonempty subset of the set $\{(x,y)|(x \in \{1,2,\ldots,L\}, y \in \{1,2,\ldots,R\})\}$. A value set of $(x,y)$ in $\{(x,y)|(x \in \{1,2,\ldots,L\}, y \in \{1,2,\ldots,R\})\}$ is $(1,1)$, $(1,2)$, ..., $(1,R)$, $(2,1)$, $(2,2)$, ..., $(2,R)$, ..., $(L,1)$, $(L,2)$, ..., and $(L,R)$.

According to the solution provided in this embodiment, a quantity of elements in each vector $D_{i,j}$ is reported, so that the quantity of the reported elements in the precoding matrix is indicated, thereby avoiding abnormal data transmission.

In a possible design, the quantity of the elements indicated by the second indication information includes: $\Sigma_{(i,j) \in S} P_{i,j}$ or $\Sigma_{(i,j) \in S}(P_{i,j}-1)$, where S is a nonempty subset of a set $\{(x,y)|(x \in \{1,2,\ldots,L\}, y \in \{1,2,\ldots,R\})\}$.

The meaning of the set $\{(x,y)|(x \in \{1,2,\ldots,L\}, y \in \{1,2,\ldots,R\})\}$ is described in the foregoing paragraph. According to the solution provided in this embodiment, a total quantity of the reported elements in the precoding matrix is directly indicated, so that an amount of data reported by the terminal device can be reduced on a basis that the network device can demodulate the CSI.

In a possible design, the quantity of the elements indicated by the second indication information includes $P_q$, where $P_q$ is a sum of the quantity $P_{i,j}$ of the elements when $j=q$ is given: $P_q=\Sigma_{j=q \text{ and } (i,j) \in S} P_{i,j}$ or $P_q=\Sigma_{j=q \text{ and } (i,j) \in S}(P_{i,j}-1)$, and S is a nonempty subset of a set $\{(x,y)|(x \in \{1,2,\ldots,L\}, y \in \{1,2,\ldots,R\})\}$.

The meaning of the set $\{(x,y)|(x \in \{1,2,\ldots,L\}, y \in \{1,2,\ldots,R\})\}$ is described in the foregoing paragraph.

In the solution provided in this embodiment, each j corresponds to a layer of the precoding matrix, so that the solution is used by the terminal device to report a quantity of reported elements corresponding to each layer. This hierarchical reporting manner helps improve a CSI demodulation rate of the network device.

In a possible design, the $P_{i,j}$ elements in the vector $D_{i,j}$ are $P_{i,j}$ elements in $W_2^{(1)}(i,j)$, $W_2^{(2)}((i,j)$, ..., and $W_2^{(K)}(i,j)$, and the matrix $F_{i,j}$ is used to obtain $W_2^{(1)}(i,j)$, $W_2^{(2)}(i,j)$, ..., and $W_2^{(K)}(i,j)$ based on the $P_{i,j}$ elements in the vector $D_{i,j}$; or the $P_{i,j}$ elements in the vector $D_{i,j}$ are phases of $P_{i,j}$ elements in $W_2^{(1)}(i,j)$, $W_2^{(2)}(i,j)$, ..., and $W_2^{(K)}(i,j)$, and the matrix $F_{i,j}$ is used to obtain the phases of $W_2^{(1)}(i,j)$, $W_2^{(2)}(i,j)$, ..., and $W_2^{(K)}(i,j)$ based on the $P_{i,j}$ elements in the vector $D_{i,j}$; or the $P_{i,j}$ elements in the vector $D_{i,j}$ are amplitudes of $P_{i,j}$ elements in $W_2^{(1)}(i,j)$, $W_2^{(2)}(i,j)$, ..., and $W_2^{(K)}(i,j)$, and the matrix $F_{i,j}$ is used to obtain the amplitudes of $W_2^{(1)}(i,j)$, $W_2^{(2)}(i,j)$, ..., and $W_2^{(K)}(i,j)$ based on the $P_{i,j}$ elements in the vector $D_{i,j}$.

In this case, the sending module is further configured to send fourth indication information, where the fourth indication information is used to indicate frequency-domain positions of the $P_{i,j}$ elements in $W_2^{(1)}(i,j)$, $W_2^{(2)}(i,j)$, ..., and $W_2^{(K)}(i,j)$ that correspond to the $P_{i,j}$ elements in the vector $D_{i,j}$.

According to the solution provided in this embodiment, not all coefficients in $W_2^{(k)}$ need to be reported, and only an element at an inflection point that can represent a frequency-domain position of $W_2^{(k)}$ needs to be reported, thereby greatly reducing an amount of data reported by the terminal device.

In another possible design, $P_{i,j}$ vectors of the matrix $F_{i,j}$ are orthogonal to each other.

In this case, the sending module is further configured to send fifth indication information, where the fifth indication information is used to indicate the matrix $F_{i,j}$.

According to the solution provided in this embodiment, matrix transformation may be performed on coefficients in frequency domain, and a limited quantity of sample points with a relatively large value are selected, from results obtained after the matrix transformation, for reporting. In this way, the amount of data reported by the terminal device is reduced.

In another possible design, the sending module is further configured to send sixth indication information, where the sixth indication information is used to indicate a quantity of the vectors $D_{i,j}$, where $(i,j) \in S$ or i,j satisfy $(i,j) \in S$ and $j=k$, and S is a nonempty subset of the set $\{(x,y)|(x \in \{1,2,\ldots,L\}, y \in \{1,2,\ldots,R\})\}$. The meaning of the set $\{(x,y)|(x \in \{1,2,\ldots,L\}, y \in \{1,2,\ldots,R\})\}$ is described in the foregoing paragraph.

In another possible design, the first indication information includes one or more bitmaps; and each bitmap is used to indicate positions of the $P_{i,j}$ elements in the vector $D_{i,j}$.

In this embodiment, the first indication information includes one bitmap, so that the bitmap is used to indicate position information of elements in all reported vectors $D_{i,j}$ in K positions. Alternatively, the first indication information includes R bitmaps, and the bitmaps are used to indicate position information, in K positions, of elements in vectors $D_{i,j}$ whose value of j is 1,2, ..., or R in all reported vectors $D_{i,j}$. Alternatively, the first indication information includes L×R or (L−1)×R bitmaps, and the bitmaps are used to indicate position information, in K positions, of an element that is in $D_{i,j}$ and that corresponds to each element in $W_2$ or each element other than an element corresponding to a largest amplitude in each column of $W_2$.

According to the solution provided in this embodiment, when the quantity of the reported elements is indicated, a position of the reported element may be indicated, and the position of the reported element does not need to be indicated in another manner. This manner has relatively high flexibility and scalability.

In another possible design, the third indication information is channel state information CSI, and the CSI includes: a first part, part 1 CSI, including the first indication information, a rank indicator RI, and a channel quality indicator CQI that corresponds to a first codeword; and a second part, part 2 CSI, including the second indication information, where the part 1 CSI and the part 2 CSI are independently encoded. In this way, the part 1 CSI may indicate a quantity of bits in the part 2 CSI, so that the network device that receives the third indication information can decode the CSI based on the information, thereby avoiding abnormal data transmission.

According to a fourth aspect, this application provides a communications apparatus, including a receiving module and a processing module. The receiving module is configured to receive third indication information, where the third indication information is used to indicate $W_2^{(1)}$, $W_2^{(2)}$, ..., and $W_2^{(K)}$ where $W^{(k)}$ is a precoding matrix in a $k^{th}$ frequency-domain unit, $W^{(k)}$ satisfies $W^{(k)}=W_1 \times W^{(k)}$, $W_1$ is an $N_t \times L$ matrix, $W_2^{(k)}$ is an $L \times R$ matrix, $0 < k \leq K$, and K is a quantity of frequency-domain units; the third indication information includes second indication information and first indication information; the second indication information is used to indicate $P_{i,j}$ elements in a vector $D_{i,j}$, where the vector $D_{i,j}$ and a matrix $F_{i,j}$ satisfy $V_{i,j}=F_{i,j} \times D_{i,j}$, the vector $V_{i,j}$ corresponds to $W_2^{(1)}(i,j)$, $W_2^{(2)}(i,j)$, ..., and $W_2^{(K)}(i,j)$, $W_2^{(k)}(i,j)$ is a complex number in an $i^{th}$ row and a $j^{th}$ column of the matrix $W_2^{(k)}$, and $F_{i,j}$ is a $K \times P_{i,j}$ matrix, where $0 < i \leq L$, $0 < j \leq R$, and $P_{i,j} < K$; and the first indication information is used to indicate a quantity of the elements indicated by the second indication information; and the processing module is configured to send downlink data based on the third indication information.

According to the solution provided in this embodiment, a quantity of elements reported in the precoding matrix is reported, so that a network device that receives the third indication information can decode CSI based on the information, and a terminal device can dynamically adjust the quantity of the reported elements based on a channel condition. This reduces resource overheads required for CSI reporting.

In a possible design, that the vector $V_{i,j}$ corresponds to $W_2^{(1)}(i,j)$, $W_2^{(2)}(i,j)$, ..., and $W_2^{(K)}(i,j)$ includes: $V_{i,j}$ is a column vector including $W_2^{(1)}(i,j)$, $W_2^{(2)}(i,j)$, ..., and $W_2^{(K)}(i,j)$; or $V_{i,j}$ is a column vector including amplitudes of $W_2^{(1)}(i,j)$ $W_2^{(2)}(i,j)$, ... and $W_2^{(K)}(i,j)$; or $V_{i,j}$ is a column vector including phases of $W_2^{(1)}(i,j)$, $W_2^{(2)}(i,j)$, ..., and $W_2^{(k)}(i,j)$. The vector $V_{i,j}$ may be represented as $V_{i,j}=[\alpha_{i,j}^1 \ldots \alpha_{i,j}^K]^T$, where $\alpha_{i,j}^k$ is $W_2^{(k)}(i,j)$, or an amplitude of $W_2^{(k)}(i,j)$, or a phase of $W_2^{(k)}(i,j)$.

In a possible design, the quantity of the elements indicated by the second indication information includes $P_{i,j}$ or $P_{i,j}-1$, and $(i,j) \in S$, where S is a nonempty subset of a set $\{(x,y)|(x \in \{1,2, \ldots, L\}, y \in \{1,2, \ldots, R\})\}$.

The set S represents value ranges of i and j in the vector $D_{i,j}$ that needs to be reported by the terminal device. It should be noted that each matrix of the matrices $W_2^{(1)}$, $W_2^{(2)}$, ..., and $W_2^{(K)}$ is a matrix with L rows and R columns. However, in the K L×R matrices, amplitudes of some elements are 0, and the terminal device may not report $D_{i,j}$ corresponding to the element whose amplitude is 0. Therefore, values of i and j are a nonempty subset of the set $\{(x,y)|(x \in \{1,2, \ldots, L\}, y \in \{1,2, \ldots, R\})\}$. A value set of (x,y) in $\{(x,y)|(x \in \{1,2, \ldots, L\}, y \in \{1,2, \ldots, R\})\}$ is (1,1), (1,2), ..., (1,R), (2,1), (2,2), ..., (2,R), ..., (L,1), (L,2), ..., and (L,R).

According to the solution provided in this embodiment, a quantity of elements in each vector $D_{i,j}$ is reported, so that the quantity of the reported elements in the precoding matrix is indicated, thereby avoiding abnormal data transmission.

In a possible design, the quantity of the elements indicated by the second indication information includes: $\Sigma_{(i,j) \in S} P_{i,j}$ or $\Sigma_{(i,j) \in S}(P_{i,j}-1)$, where S is a nonempty subset of a set $\{(x,y)|(x \in \{1,2, \ldots, L\}, y \in \{1,2, \ldots, R\})\}$.

The meaning of the set $\{(x,y)|(x \in \{1,2, \ldots, L\}, y \in \{1,2, \ldots, R\})\}$ is described in the foregoing paragraph. According to the solution provided in this embodiment, a total quantity of the reported elements in the precoding matrix is directly indicated, so that an amount of data reported by the terminal device can be reduced on a basis that the network device can demodulate the CSI.

In a possible design, the quantity of the elements indicated by the second indication information includes $P_q$, where $P_q$ is a sum of the quantity $P_{i,j}$ of the elements when j=q is given: $P_q = \Sigma_{j=q \text{ and } (i,j) \in S} P_{i,j}$ or $P_q => \Sigma_{j=q \text{ and } (i,j) \in S}(P_{i,j}-1)$, and S is a nonempty subset of a set $\{(x,y)|(x \in \{1,2, \ldots, L\}, y \in \{1,2, \ldots, R\})\}$.

The meaning of the set $\{(x,y)|(x \in \{1,2, \ldots, L\}, y \in \{1,2, \ldots, R\})\}$ is described in the foregoing paragraph. In the solution provided in this embodiment, each j corresponds to a layer of the precoding matrix, so that the solution is used by the terminal device to report a quantity of reported elements corresponding to each layer. This hierarchical reporting manner helps improve a CSI demodulation rate of the network device.

In a possible design, the $P_{i,j}$ elements in the vector $D_{i,j}$ are $P_{i,j}$ elements in $W_2^{(1)}(i,j)$, $W_2^{(2)}(i,j)$, ..., and $W_2^{(K)}(i,j)$, and the matrix $F_{i,j}$ is used to obtain $W_2^{(1)}(i,j)$, $W_2^{(1)}(i,j)$, ..., and $W_2^{(K)}(i,j)$ based on the $P_{i,j}$ elements in the vector $D_{i,j}$; or the $P_{i,j}$ elements in the vector $D_{i,j}$ are phases of $P_{i,j}$ elements in $W_2^{(1)}(i,j)$, $W_2^{(2)}(i,j)$, ..., and $W_2^{(K)}(i,j)$, and the matrix $F_{i,j}$ is used to obtain the phases of $W_2^{(1)}(i,j)$, $W_2^{(2)}(i,j)$, ..., and $W_2^{(K)}(i,j)$ based on the $P_{i,j}$ elements in the vector $D_{i,j}$; or the $P_{i,j}$ elements in the vector $D_{i,j}$ are amplitudes of $P_{i,j}$ elements in $W_2^{(i,j)}(i,j)$, $W_2^{(2)}(i,j)$, ..., and $W_2^{(K)}(i,j)$, and the matrix $F_{i,j}$ is used to obtain the amplitudes of $W_2^{(i,j)}(i,j)$, $W_2^{(2)}(i,j)$, ..., and $W_2^{(K)}(i,j)$ based on the $P_{i,j}$ elements in the vector $D_{i,j}$.

In this case, the receiving module is further configured to receive fourth indication information, where the fourth indication information is used to indicate frequency-domain positions of the $P_{i,j}$ elements in $W_2^{(1)}(i,j)$, $W_2^{(2)}(i,j)$, ..., and $W_2^{(K)}(i,j)$ that correspond to the $P_{i,j}$ elements in the vector $D_{i,j}$.

According to the solution provided in this embodiment, not all coefficients in $W_2^{(k)}$ need to be reported, and only an element at an inflection point that can represent a frequency-domain position of $W_2^{(k)}$ needs to be reported, thereby greatly reducing an amount of data reported by the terminal device.

In another possible design, $P_{i,j}$ vectors of the matrix $F_{i,j}$ are orthogonal to each other.

In this case, the receiving module is further configured to receive fifth indication information, where the fifth indication information is used to indicate the matrix $F_{i,j}$.

According to the solution provided in this embodiment, matrix transformation may be performed on coefficients in frequency domain, and a limited quantity of sample points with a relatively large value are selected, from results obtained after the matrix transformation, for reporting. In this way, the amount of data reported by the terminal device is reduced.

In another possible design, the receiving module is further configured to receive sixth indication information, where the sixth indication information is used to indicate a quantity of the vectors $D_{i,j}$, where $(i,j) \in S$ or $(i,j) \in S$ and $j=q$ are satisfied, and S is a nonempty subset of the set $\{(x,y)|(x \in \{1,2, \ldots, L\}, y \in \{1,2, \ldots, R\})\}$. The meaning of the set $\{(x,y)|(x \in \{1, 2, \ldots, L\}, y \in \{1,2, \ldots, R\})\}$ is described in the foregoing paragraph.

In another possible design, the first indication information includes one or more bitmaps; and each bitmap is used to indicate positions of the $P_{i,j}$ elements in the vector $D_{i,j}$.

In this embodiment, the first indication information includes one bitmap, so that the bitmap is used to indicate position information of elements in all reported vectors $D_{i,j}$ in K positions. Alternatively, the first indication information includes R bitmaps, and the bitmaps are used to indicate position information, in K positions, of elements in vectors $D_{i,j}$ whose value of j is 1, 2, . . . , or R in all reported vectors $D_{i,j}$. Alternatively, the first indication information includes L×R or (L−1)×R bitmaps, and the bitmaps are used to indicate position information, in K positions, of an element that is in $D_{i,j}$ and that corresponds to each element in $W_2$ or each element other than an element corresponding to a largest amplitude in each column of $W_2$.

According to the solution provided in this embodiment, when the quantity of the reported elements is indicated, a position of the reported element may be indicated, and the position of the reported element does not need to be indicated in another manner. This manner has relatively high flexibility and scalability.

In another possible design, the third indication information is channel state information CSI, and the CSI includes: a first part, part 1 CSI, including the first indication information, a rank indicator RI, and a channel quality indicator CQI that corresponds to a first codeword; and a second part, part 2 CSI, including the second indication information, where the part 1 CSI and the part 2 CSI are independently encoded. In this way, the part 1 CSI may indicate a quantity of bits in the part 2 CSI, so that the network device that receives the third indication information can decode the CSI based on the information, thereby avoiding abnormal data transmission.

According to a fifth aspect, this application provides a communications apparatus, including a transceiver, a processor, a memory, and a bus. The transceiver, the processor, and the memory are connected to the bus, the memory stores program instructions, and the processor runs the program instructions to perform the method according to the first aspect or the second aspect.

According to a sixth aspect, this application provides a computer-readable storage medium. The computer-readable storage medium stores a computer program, and when the computer program is run on a computer, the computer is enabled to perform the method according to the first aspect or the second aspect.

According to a seventh aspect, this application provides a computer program product including instructions. When the instructions are run on a computer, the computer is enabled to perform the method according to the first aspect or the second aspect.

In a possible design, all or some of programs in the seventh aspect may be stored in a storage medium encapsulated with a processor, or some or all of programs may be stored in a memory that is not encapsulated with a processor.

It can be learned that in the foregoing aspects, the third indication information is generated, so that the quantity of the reported elements indicated by the second indication information is obtained through the first indication information in the third indication information. After receiving the third indication information, the network device can demodulate the part 2 CSI based on the quantity indicated by the first indication information, so that normal data transmission can be implemented.

BRIEF DESCRIPTION OF DRAWINGS

FIG. 1 is a schematic diagram of an application scenario according to an embodiment of this application;

FIG. 2 is a schematic flowchart of a precoding matrix indication method according to this application;

DESCRIPTION OF EMBODIMENTS

Figure 3:
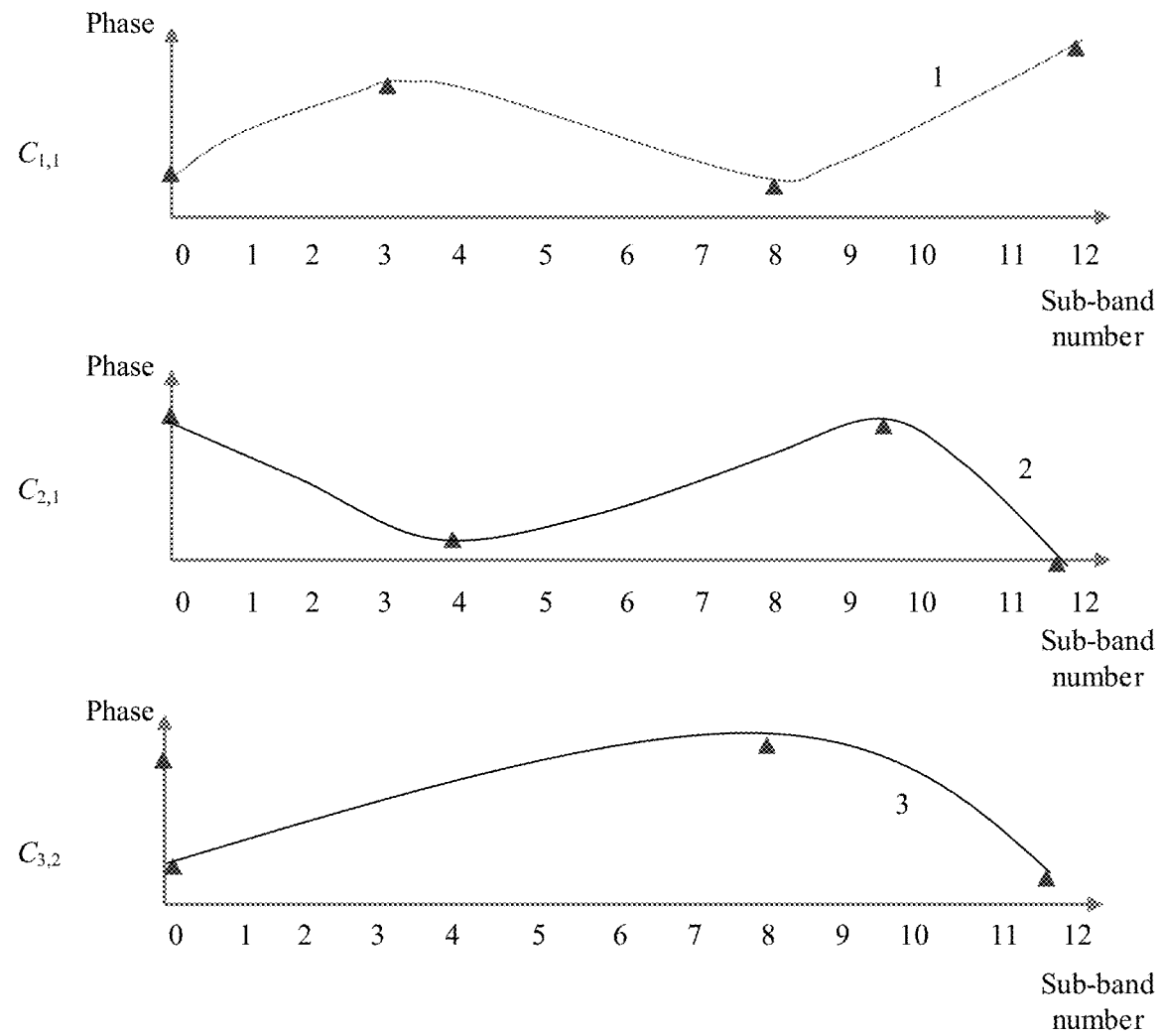
FIG. 3 is a curve of a frequency-domain relationship between a phase and a sub-band number of each vector $D_{i,j}$ according to this application.

Terms used in implementations of this application are merely used to explain specific embodiments of this application, but are not intended to limit this application.

The embodiments of this application may be used in various types of communications systems. FIG. 1 is a schematic diagram of an application scenario according to an embodiment of this application. As shown in FIG. 1, a communications system mainly includes a network device 11 and a terminal device 12.

(1) The network device 11 may be a network side device, for example, a wireless-fidelity (Wi-Fi) access point AP, a next-generation communications base station such as a gNB, a small cell, and a micro cell of 5G, or a transmission reception point (TRP), or may be a relay station, an access point, a vehicle-mounted device, a wearable device, or the like. In this embodiment, base stations in communications systems of different communications standards are different. For distinction, a base station in a 4G communications system is referred to as an LTE eNB, a base station in a 5G communications system is referred to as an NR gNB, and a base station that supports both the 4G communications system and the 5G communications system is referred to as an eLTE eNB. These names are merely for ease of distinction, and are not intended for limitation.

(2) The terminal device 12 is also referred to as user equipment (UE) or customer premise equipment (CPE), and is a device that provides a user with voice and/or data connectivity, for example, a handheld device or a vehicle-mounted device with a wireless connection function. A common terminal device includes, for example, a mobile phone, a tablet, a notebook computer, a palmtop computer, a mobile internet device (MID), and a wearable device such as a smartwatch, a smart band, and a pedometer.

(3) "A plurality of" means two or more, and another quantifier is similar to this. The term "and/or" describes a correspondence between associated objects and represents that three relationships may exist. For example, A and/or B may represent the following three cases: Only A exists, both A and B exist, and only B exists. The character "/" generally indicates an "or" relationship between the associated objects.

In this application, "at least one" means one or more, and "a plurality of" means two or more than two. The term "and/or" describes an association relationship between associated objects and represents that three relationships may exist. For example, A and/or B may represent the following cases: Only A exists, both A and B exist, and only B exists, where A and B may be singular or plural. The character "/" generally indicates an "or" relationship between the associated objects. "At least one (one piece) of the following" or a similar expression thereof refers to any combination of these items, including any combination of singular items (piece or plural items (pieces). For example, at least one (one piece) of a, b, or c may indicate: a, b, c, a-b, a-c, b-c, or a-b-c, where a, b, and c may be singular or plural.

It should be noted that, a quantity and types of terminal devices 12 included in the communications system shown in FIG. 1 are merely examples, and this embodiment of this application is not limited thereto. For example, more terminal devices 12 that communicate with the network device 11 may be further included. For brevity, details are not described in the accompanying drawings. In addition, in the communications system shown in FIG. 1, although the network device 11 and the terminal device 12 are shown, the communications system may include but is not limited to the network device 11 and the terminal device 12, for example, may further include a core network node or a device configured to carry a virtualized network function. This is obvious to a person skilled in the art, and details are not described herein.

In addition, the embodiments of this application may be used in not only a next-generation wireless communications system, that is, the 5G communications system, but also another system that may appear in the future, for example, a next-generation Wi-Fi network or a 5G internet of vehicles.

It should be noted that, with continuous evolution of the communications system, names of network elements in another system that may appear in the future may change. In this case, the solutions provided in the embodiments of this application are also applicable.

First, a precoding matrix is explained and described in this embodiment of this application. The precoding matrix may be represented as $W^{(1)}, W^{(2)}, \ldots,$ and $W^{(K)}$, where $W^{(k)}$ is a precoding matrix in a $k^{th}$ frequency-domain unit, $0 < k \le K$, and K is a quantity of frequency-domain units.

The precoding matrix $W^{(k)}$ in any (the $k^{th}$) frequency-domain unit satisfies $W^{(k)} = W_1 \times W_2^{(k)}$, $W_1$ is an $N_t \times L$ matrix, and $W_2^{(k)}$ is an $L \times R$ matrix. That is, $W^{(k)}$ is an $N_t \times R$ matrix.

In a possible implementation scenario, a precoding matrix on each frequency-domain unit satisfies $W = W_1 \times W_2$ (herein, impact of the frequency-domain unit is ignored, and the superscript (k) is temporarily omitted during numbering), where $W_1$ is a diagonal block matrix, each block matrix includes L/2 orthogonal two-dimensional discrete Fourier transform (DFT) vectors, and L is an even number greater than 0. In this case, $W_1$ may be represented as:

$$W_1 = \begin{bmatrix} b_1^m \ldots b_{L/2}^m & 0 \\ 0 & b_1^m \ldots b_{L/2}^m \end{bmatrix}$$

where $b_l^m$ represents a beam vector, $l=1, \ldots, L/2$, and the beam vectors are orthogonal to each other.

In addition, according to different quantities of ranks (RI), representation forms of $W_2$ are different. A phase and an amplitude are two characteristics of a signal, so that the signal may be described from two angles: the phase and the amplitude. For ease of understanding, this embodiment of this application provides the following two representation forms of $W_2$.

In a feasible implementation scenario, when a rank is 1, $W_2$ may be represented as:

$$W_2 = \begin{bmatrix} p_{1,1}^{(WB)} \cdot p_{1,1}^{(SB)} \cdot c_{1,1} \\ p_{2,1}^{(WB)} \cdot p_{2,1}^{(SB)} \cdot c_{2,1} \\ \vdots \\ p_{L/2,1}^{(WB)} \cdot p_{L/2,1}^{(SB)} \cdot c_{L/2,1} \\ p_{\frac{L}{2}+1,1}^{(WB)} \cdot p_{\frac{L}{2}+1,1}^{(SB)} \cdot c_{\frac{L}{2}+1,1} \\ \vdots \\ p_{L,1}^{(WB)} \cdot p_{L,1}^{(SB)} \cdot c_{L,1} \end{bmatrix}$$

In a feasible implementation scenario, when a rank is 2, $W_2$ may be represented as:

$$W_2 = \begin{bmatrix} p_{1,1}^{(WB)} \cdot p_{1,1}^{(SB)} \cdot c_{1,1} & p_{1,2}^{(WB)} \cdot p_{1,2}^{(SB)} \cdot c_{1,2} \\ p_{2,1}^{(WB)} \cdot p_{2,1}^{(SB)} \cdot c_{2,1} & p_{2,2}^{(WB)} \cdot p_{2,2}^{(SB)} \cdot c_{2,2} \\ \vdots & \vdots \\ p_{L/2,1}^{(WB)} \cdot p_{L/2,1}^{(SB)} \cdot c_{L/2,1} & p_{L/2,2}^{(WB)} \cdot p_{L/2,2}^{(SB)} \cdot c_{L/2,2} \\ p_{\frac{L}{2}+1,1}^{(WB)} \cdot p_{\frac{L}{2}+1,1}^{(SB)} \cdot c_{\frac{L}{2}+1,1} & p_{\frac{L}{2}+1,2}^{(WB)} \cdot p_{\frac{L}{2}+1,2}^{(SB)} \cdot c_{\frac{L}{2}+1,2} \\ \vdots & \vdots \\ p_{L,1}^{(WB)} \cdot p_{L,1}^{(SB)} \cdot c_{L,1} & p_{L,2}^{(WB)} \cdot p_{L,2}^{(SB)} \cdot c_{L,2} \end{bmatrix}$$

where $p_{i,j}^{(WB)}$ represents wideband amplitude information, and $p_{i,j}^{(SB)}$ represents sub-band amplitude information, where $p_{i,j}^{(WB)} \in \{1, \sqrt{0.5}, \sqrt{0.25}, \sqrt{0.125}, \sqrt{0.0625}, \sqrt{0.0313}, \sqrt{0.0156}, 0\}$, $p_{i,j}^{(SB)} \in \{1, \sqrt{0.5}\}$, j is a column number of the matrix $W_2$, and also represents a sequence number of a layer of data, i represents a row number of the matrix $W_2$, $c_{i,j}$ represents phase information, and $$c_{i,j} \in \{e^{j\frac{\pi n}{2}}, n = 0, 1, 2, 3\} \text{ or } c_{i,j} \in \{e^{j\frac{\pi n}{4}}, n = 0, 1, 2, 3 \ldots, 7\}.$$

Based on the foregoing architecture of the precoding matrix, in the prior art, to reduce a reporting amount as much as possible, a CSI compression solution is used. Essence of the solution is: For each coefficient in each $W_2$, by using a transform-domain operation, a frequency-domain element that needs to be reported is transformed to a transform domain, and then a limited quantity of large-value sample points are selected from elements of the transform domain for reporting, where the transform-domain operation includes, but is not limited to, inverse discrete Fourier transform (IDFT), discrete Fourier transform (DFT), discrete cosine transform (DCT), and inverse discrete cosine transform (IDCT).

For ease of understanding, this embodiment of this application provides a solution of implementing CSI compression through IDFT transform. Specifically, for any coefficient $p_{i,j}^{(WB)} \cdot p_{i,j}^{(SB)} \cdot c_{i,j}$ in the foregoing $W_2$, coefficients $p_{i,j}^{(WB)} \cdot p_{i,j}^{(SB)} \cdot c_{i,j}$ of K sub-bands form $X_{i,j}$, and reference are made to Table 1.

TABLE 1

| Coefficient | Sub-band 1 | Sub-band 2 | ... | Sub-band K |
|---|---|---|---|---|
| $X_{1,1}$ | $x_{1,1}^{(1)}$ | $x_{1,1}^{(2)}$ | ... | $x_{1,1}^{(K)}$ |
| $X_{2,1}$ | $x_{2,1}^{(1)}$ | $x_{2,1}^{(2)}$ | ... | $x_{2,1}^{(K)}$ |
| ... | ... | ... | ... | ... |
| $X_{L,R}$ | $x_{L,R}^{(1)}$ | $x_{L,R}^{(2)}$ | ... | $x_{L,R}^{(K)}$ |

Then, IDFT transform is performed on each coefficient $X_{i,j}$ in Table 1 to obtain $Y_{i,j}$, where $Y_{i,j}=\text{IDFT}(X_{i,j})$. In this case, Table 2 shows a representation form of $Y_{i,j}$:

TABLE 2

| Transform-domain coefficient | Time-domain sample point 1 | Time-domain sample point 2 | ... | Time-domain sample point K |
|---|---|---|---|---|
| $Y_{1,1}$ | $y_{1,1}^{(1)}$ | $y_{1,1}^{(2)}$ | ... | $y_{1,1}^{(K)}$ |
| $Y_{2,1}$ | $y_{2,1}^{(1)}$ | $y_{2,1}^{(2)}$ | ... | $y_{2,1}^{(K)}$ |
| ... | ... | ... | ... | ... |
| $Y_{L,R}$ | $y_{L,R}^{(1)}$ | $y_{L,R}^{(2)}$ | ... | $y_{L,R}^{(K)}$ |

After the IDFT transform, when performing CSI reporting, the terminal device may select a limited quantity of large-value sample points from each $Y_{i,j}$ for reporting. Limited quantities of large-value sample points selected from all $Y_{i,j}$ may be the same or different, and positions (a sequence number of a time-domain sample point) of the limited quantities of large-value sample points selected from all $Y_{i,j}$ for reporting may be the same or different.

For example, if in $Y_{1,1}$, values of the time-domain sample point 1 and the time-domain sample point 2 are relatively large, and values of other time-domain sample points are relatively small, for $Y_{1,1}$, $y_{1,1}^{(1)}$ and $y_{1,1}^{(2)}$ are reported.

For another example, if in $Y_{2,1}$, a value of a time-domain sample point 4 is relatively large, and values of other time-domain sample points are relatively small, for the element $Y_{2,1}$, $y_{2,1}^{(4)}$ is reported.

In addition, there is another solution for reducing the CSI reporting amount. In each row in Table 1, the terminal device does not need to report a coefficient $x_{i,j}^{(k)}$ of each sub-band to a base station, where k=1, 2, . . . , K. The terminal device selects $P_{i,j}$ coefficients from K coefficients in each row for reporting. According to the $P_{i,j}$ coefficients reported by the terminal device and positions of the $P_{i,j}$ coefficients in the K sub-bands, the base station device may obtain a complex coefficient in an $i^{th}$ row and a $j^{th}$ column of $W_2$ of the K sub-bands in an interpolation manner.

In a possible interpolation method, linear interpolation is used, that is, a coefficient $$x_{i,j}^{(k_1+n)} = \frac{x_{i,j}^{(k_2)} - x_{i,j}^{(k_1)}}{k_2 - k_1} \times n + x_{i,j}^{(k_1)}$$

on a $(k_1+n)^{th}$ sub-band is obtained by using $x_{i,j}^{(k_1)}$ on a $k_1^{th}$ sub-band and $x_{i,j}^{(k_2)}$ on a $k_2^{th}$ sub-band that are reported by the terminal device, where $k_1$ and $k_2$ are position indexes of two adjacent sub-bands selected by the terminal device, and $0<n<k_2-k_1$.

It should be noted that, the $P_{i,j}$ coefficients may be $P_{i,j}$ coefficients $x_{i,j}^{(k)}$, or sub-band phases of $P_{i,j}$ coefficients $x_{i,j}^{(k)}$, or sub-band amplitudes of $P_{i,j}$ coefficients $x_{i,j}^{(k)}$, or include phases of $P_{i,j}^1$ coefficients $x_{i,j}^{(k)}$ and amplitudes of $P_{i,j}^2$ coefficients $x_{i,j}^{(k)}$.

In another possible implementation solution, in each row in Table 1, the terminal device reports $x_{i,j}^{(1)}$ and difference coefficients $\beta_{i,j}^{(2)}, \beta_{i,j}^{(3)}, \ldots$, and $\beta_{i,j}^{(P_{i,j})}$. According to $x_{i,j}^{(1)}$, $\beta_{i,j}^{(2)}, \beta_{i,j}^{(3)}, \ldots$, and $\beta_{i,j}^{(P_{i,j})}$, and frequency-domain sub-band positions (that is, inflection point positions) corresponding to the reported coefficients, the base station device may obtain a complex coefficient in an $i^{th}$ row and a $j^{th}$ column of $W_2$ of the K sub-bands in an interpolation manner, where n=2, 3, . . . , and $P_{i,j}-1$.

In a possible interpolation method, linear interpolation is used, that is, a sub-band coefficient between the sub-band 1 and a sub-band $k_1$ may be obtained by using $x_{i,j}^{(1)}$ reported by the terminal device and the sub-band position $k_1$, for example, $x_{i,j}^{(n)} = x_{i,j}^{(1)} + (n-1) \times \beta_{i,j}^{(2)}$. Likewise, a sub-band coefficient between the sub-band $k_1$ and a sub-band $k_2$ may be obtained according to the obtained $x_{i,j}^{(k_1)}$ and $\beta_{i,j}^{(3)}$, for example, $x_{i,j}^{(k_1+n)} = x_{i,j}^{(k_1)} + (n-1) \times \beta_{i,j}^{(3)}$. The rest can be deduced by analogy.

In conclusion, the reporting amount of the terminal device can be reduced by using the CSI compression solution.

In an existing new radio (NR) technology, CSI reported by the terminal device includes two parts. A quantity of bits of part 2 CSI can be determined based on an RI and a quantity of non-zero wideband amplitude coefficients in $W_1$ that are in part 1 CSI, and the base station may demodulate the part 2 CSI based on information in the part 1 CSI. However, if the CSI compression solution is extended based on the NR technology, because a quantity of non-zero elements reported in each element $Y_{i,j}$ is different, if an existing precoding matrix indication method is used, the quantity of bits in the part 2 CSI cannot be determined based on the RI and the quantity of non-zero wideband amplitude coefficients in $W_1$ that are reported in the part 1 CSI. Therefore, after the base station receives indication information of the precoding matrix, it is difficult for the base station to demodulate the indication information, thereby affecting normal data transmission.

The precoding matrix indication method provided in this embodiment of this application is provided to resolve the foregoing problem in the prior art.

FIG. 2 shows a precoding matrix indication method according to this application. As shown in FIG. 2, the method includes the following steps.

S202: A terminal device generates third indication information.

The third indication information is used to indicate $W_2^{(1)}$, $W_2^{(2)}, \ldots$, and $W_2^{(K)}$, where $W^{(k)}$ is a precoding matrix in a $k^{th}$ frequency-domain unit, $W^{(k)}$ satisfies $W^{(k)} = W_1 \times W_2^{(k)}$, $W_1$ is an $N_t \times L$ matrix, $W_2^{(k)}$ is an $L \times R$ matrix, $0 < k \leq K$, and K is a quantity of frequency-domain units.

The third indication information includes second indication information and first indication information.

The second indication information is used to indicate $P_{i,j}$ elements in a vector $D_{i,j}$, where the vector $D_{i,j}$ and a matrix $F_{i,j}$ satisfy $V_{i,j} = F_{i,j} \times D_{i,j}$, the vector $V_{i,j}$ corresponds to $W_2^{(1)}(i,j)$, $W_2^{(2)}(i,j)$, ..., and $W_2^{(K)}(i,j)$, $W_2^{(k)}(i,j)$ is a complex number in an $i^{th}$ row and a $j^{th}$ column of the matrix $W_2^{(k)}$, and $F_{i,j}$ is a $K \times P_{i,j}$ matrix, where $0 < i \leq L$, $0 < j \leq R$, and $P_{i,j} < K$.

The first indication information is used to indicate a quantity of the elements indicated by the second indication information.

S204: The terminal device sends the third indication information.

The following describes in detail the precoding matrix indication method shown in FIG. 2 with reference to an embodiment.

According to the precoding matrix indication method provided in this embodiment of this application, the $P_{i,j}$ elements in the vector $D_{i,j}$ indicated by the second indication information is a finally reported limited quantity of elements, and the first indication information indicates the quantity of the elements indicated by the second indication information. In this way, through the quantity of the elements indicated by the first indication information, after receiving the third indication information, a base station may generate the precoding matrix based on the first indication information and the second indication information. In this way, the precoding matrix is indicated.

Further, the precoding matrix indication method provided in this application is applicable to a CSI compression solution, that is, is applicable to a solution in which only a limited quantity of elements corresponding to each element are reported during precoding matrix indication. In this case, the third indication information is CSI. The CSI includes two parts that are independently encoded: part 1 CSI and part 2 CSI, the first indication information may be carried in the part 1 CSI, and the second indication information may be carried in the part 2 CSI, so that the base station can demodulate the part 2 CSI, and further implement data transmission by using the elements reported in the second indication information. That is, in this case, the part 1 CSI in the CSI sent by the terminal device may include but is not limited to the following information: the first indication information, a rank indicator RI, and a channel quality indicator CQI of a first codeword. The part 2 CSI may include but is not limited to the following information: the second indication information and a precoding matrix indicator (PMI). In this way, when the base station receives the CSI, the base station may determine a quantity of bits in the part 2 CSI through the first indication information carried in the part 1 CSI.

As described above, in $W_2^{(k)}$ in a precoding matrix in any frequency-domain unit, any coefficient (for example, a coefficient in an $i^{th}$ row and a $j^{th}$ column) may satisfy the following relationship: $x_{i,j}^{(k)} = p_{i,j}^{(WB)(k)} \cdot p_{i,j}^{(SB)(k)} \cdot c_{i,j}^{(k)}$, that is, all coefficients in each $W_2^{(k)}$ may be represented by a wideband amplitude ($p_{i,j}^{(WB)(k)}$), a sub-band amplitude ($p_{i,j}^{(SB)(k)}$), and a phase ($c_{i,j}^{(k)}$). In this way, in specific implementation, that the vector $V_{i,j}$ corresponds to $W_2^{(1)}(i,j)$, $W_2^{(2)}(i,j)$, ..., and $W_2^{(K)}(i,j)$, where $W_2^{(k)}(i,j) = x_{i,j}^{(k)}$, may include the following cases:

$V_{i,j}$ is a column vector including $W_2^{(1)}(i,j)$, $W_2^{(2)}(i,j)$, ..., and $W_2^{(K)}(i,j)$; or $V_{i,j}$ is a column vector including amplitudes of $W_2^{(1)}(i,j)$, $W_2^{(2)}(i,j)$, ..., and $W_2^{(K)}(i,j)$; or $V_{i,j}$ is a column vector including phases of $W_2^{(1)}(i,j)$, $W_2^{(2)}(i,j)$, ..., and $W_2^{(K)}(i,j)$.

That $V_{i,j}$ is a column vector including amplitudes of $W_2^{(1)}(i,j)$, $W_2^{(2)}(i,j)$, ..., and $W_2^{(K)}(i,j)$ may include that $V_{i,j}$ is a column vector including wideband amplitudes and/or sub-band amplitudes of $W_2^{(1)}(i,j)$, $W_2^{(2)}(i,j)$, ..., and $W_2^{(K)}(i,j)$.

That is, the vector $V_{i,j}$ may be represented as $V_{i,j} = [\alpha_{i,j}^1 \ldots \alpha_{i,j}^K]$, where $\alpha_{i,j}^k$ is $W_2^{(k)}(i,j)$, or an amplitude of $W_2^{(k)}(i,j)$, or a phase of $W_2^{(k)}(i,j)$.

Based on that the vector $V_{i,j}$ corresponds to $W_2^{(1)}(i,j)$, $W_2^{(2)}(i,j)$, ..., and $W_2^{(K)}(i,j)$ and that the vector $D_{i,j}$ and the matrix $F_{i,j}$ satisfy $V_{i,j} = F_{i,j} \times D_{i,j}$, the $P_{i,j}$ elements in the vector $D_{i,j}$ are the finally reported limited quantity of elements. In this case, the first indication information is used to specifically indicate the quantity of these reported elements. In this case, the indication manner may specifically include but is not limited to the following indication manners:

In a first manner, a quantity of elements in each vector $D_{i,j}$ reported in the second indication information is indicated.

For example, as described above, the $P_{i,j}$ elements in each vector $D_{i,j}$ are finally reported. In this case, the quantity of the elements indicated by the second indication information may be the quantity of the elements in each vector $D_{i,j}$, that is, $P_{i,j}$, and $(i,j) \in S$. S is a nonempty subset of a set $\{(x,y) | (x \in \{1,2,\ldots,L\}, y \in \{1,2,\ldots,R\})\}$.

Alternatively, in another feasible implementation scenario, an element with a largest value in the $P_{i,j}$ elements in each vector $D_{i,j}$ may be separately reported. In this case, the quantity of the elements indicated by the second indication information may be a quantity of elements other than the separately reported element with the largest value in each vector $D_{i,j}$, and may be specifically represented as: $P_{i,j} - 1$, where $(i,j) \in S$. S is a nonempty subset of a set $\{(x,y) | (x \in \{1,2,\ldots,L\}, y \in \{1,2,\ldots,R\})\}$, and 1 represents the separately reported element with the largest value.

In addition, in another possible implementation scenario, if z elements whose values rank top in the $P_{i,j}$ elements in each vector $D_{i,j}$ are separately reported, the quantity of the elements indicated by the second indication information may be a quantity of elements other than the separately reported z elements in each vector $D_{i,j}$, and may be represented as: $P_{i,j} - z$, where $(i,j) \in S$. S is a nonempty subset of a set $\{(x,y) | (x \in \{1,2,\ldots,L\}, y \in \{1,2,\ldots,R\})\}$, and z represents the separately reported plurality of elements.

The set S in this application indicates value ranges of i and j in the vector $D_{i,j}$ that needs to be reported by the terminal device. A same concept is used for a subsequent set S. Details are not described again. It should be noted that each matrix of the matrices $W_2^{(1)}$, $W_2^{(2)}$, ..., and $W_2^{(K)}$ is a matrix with L rows and R columns. However, in the K $L \times R$ matrices, amplitudes of some elements are 0, and the terminal device may not report $D_{i,j}$ corresponding to the element whose amplitude is 0. Therefore, values of i and j are a nonempty subset of the set $\{(x,y) | (x \in \{1,2,\ldots,L\}, y \in \{1,2,\ldots,R\})\}$. A value set of (x,y) in $\{(x,y) | (x \in \{1,2,\ldots,L\}, y \in \{1,2,\ldots,R\})\}$ is (1,1), (1,2), ..., (1,R), (2,1), (2,2), ..., (2,R), ..., (L, 1), (L, 2), ..., and (L,R).

For example, Table 2 is used as an example, and the second indication information indicates two vectors $D_{1,1}$ and $D_{3,1}$. The first vector $D_{1,1}$ includes two elements: $y_{1,1}^{(1)}$ and $y_{1,1}^{(2)}$, and a quantity $P_{1,1}$ of the elements in the vector $D_{1,1}$ is 2. The second vector $D_{3,1}$ includes one element: $y_{3,1}^{(4)}$, and a quantity $P_{3,1}$ of the element in the vector $D_{3,1}$ is 1.

In this case, the first indication information may separately indicate the quantities of the elements in the two vectors $D_{1,1}$ and $D_{3,1}$:2 and 1. Alternatively, if an element with a largest value is separately reported in each vector, the first indication information may be used to separately indicate a quantity of elements other than the separately reported elements with the largest value in the two vectors $D_{1,1}$ and $D_{3,1}$:1 (2−1=1) and 0 (1−1=0).

A quantity of elements in each vector $D_{i,j}$ can be determined in a manner of separately reporting each vector $D_{i,j}$, so that the base station demodulates each vector $D_{i,j}$ after receiving the third indication information.

In a second manner, a quantity of all elements reported in the second indication information is indicated.

In this case, the quantity of the elements indicated by the second indication information may be a sum of quantities of all elements in the vector $D_{i,j}$. The quantity may be specifically represented as $\Sigma_{(i,j)\in S}P_{i,j}$, where S is a nonempty subset of a set $\{(x,y)|(x\in\{1,2,\ldots,L\}, y\in\{1,2,\ldots,R\})\}$.

Alternatively, in another feasible implementation scenario, an element with a largest value in the $P_{i,j}$ elements in each vector $D_{i,j}$ may be separately reported. In this case, the quantity of the elements indicated by the second indication information may be a sum of quantities of elements other than the separately reported element with the largest value in the vector $D_{i,j}$, and may be specifically represented as: $\Sigma_{(i,j)\in S}(P_{i,j}-1)$, where S is a nonempty subset of a set $\{(x,y)|(x\in\{1,2,\ldots,L\}, y\in\{1,2,\ldots,R\})\}$, and 1 represents the separately reported element with the largest value.

In addition, in another possible implementation scenario, if z elements whose values rank top in the $P_{i,j}$ elements in each vector $D_{i,j}$ are separately reported, when the third indication information is generated, the quantity of the elements indicated by the second indication information is a sum of quantities of elements other than the separately reported z elements in the vector $D_{i,j}$, and may be specifically represented as: $\Sigma_{(i,j)\in S}(P_{i,j}-z)$, where S is a nonempty subset of a set $\{(x,y)|(x\in\{1,2,\ldots,L\}, y\in\{1,2,\ldots,R\})\}$, and z represents the separately reported plurality of elements.

Table 2 is still used as an example, and the second indication information indicates two vectors $D_{1,1}$ and $D_{3,1}$. The first vector $D_{1,1}$ includes two elements: $y_{1,1}^{(1)}$ and $y_{1,1}^{(2)}$, and a quantity $P_{1,1}$ of the elements in the vector $D_{1,1}$ is 2. The second vector $D_{3,1}$ includes one element: $y_{3,1}^{(4)}$, and a quantity $P_{3,1}$ of the element in the vector $D_{3,1}$ is 1.

In this case, the first indication information is used to indicate that a total quantity of elements in the two vectors $D_{1,1}$ and $D_{3,1}$ is 3 (2+1=3). Alternatively, if an element with a largest value is separately reported in each vector, the first indication information may be used to indicate a total quantity of elements other than the separately reported elements with the largest value in the two vectors $D_{i,j}$:1 (1+0=1).

Reporting the total quantity can assist the network device (the base station) in demodulating the part 2 CSI, and can further effectively reduce a reporting amount of the terminal device.

In a third manner, the quantity of the elements reported in the second indication information is indicated according to a ($k^{th}$) layer.

In this case, the quantity of the elements indicated by the second indication information includes $P_q$, where $P_q$ is a sum of the quantity $P_{i,j}$ of the elements when j=q is given: $P_q=\Sigma_{j=q\ and\ (i,j)\in S}P_{i,j}$, and S is a nonempty subset of a set $\{(x,y)|(x\in\{1,2,\ldots,L\}, y\in\{1,2,\ldots,R\})\}$.

For example, Table 2 is still used as an example, and the second indication information indicates three vectors $D_{1,1}$, $D_{3,1}$, and $D_{1,2}$. The first vector $D_{1,1}$ includes two elements: $y_{1,1}^{(1)}$ and $y_{1,1}^{(2)}$, and a quantity $P_{1,1}$ of the elements in the vector $D_{1,1}$ is 2. The second vector $D_{3,1}$ includes one element: $y_{3,1}^{(4)}$, and a quantity $P_{3,1}$ of the element in the vector $D_{3,1}$ is 1. The third vector $D_{1,2}$ includes four elements: $y_{1,2}^{(1)}$, $y_{1,2}^{(2)}$, $y_{1,2}^{(4)}$, and $y_{1,2}^{(6)}$, and a quantity $P_{1,2}$ of the elements in the vector $D_{1,2}$ is 4.

In this case, the first indication information may be used to indicate that a total quantity of elements reported at a given data layer whose sequence number is 1 is 3, and be used to indicate that a total quantity of elements reported at a given data layer whose sequence number is 2 is 4.

In addition, if the foregoing implementation scenario of separately reporting one element with a largest value or a plurality of elements with a relatively large value is involved, a quantity of separately reported elements is further removed from the elements reported at each layer, and then a quantity of remaining elements is summed and reported. For example, if one element with a largest value is separately reported, the quantity $P_q$ of the elements indicated by the second indication information is a sum of the quantity $P_{i,j}$ of the elements when j=q is given: $P_q=\Sigma_{j=q\ and\ (i,j)\in S}(P_{i,j}-1)$, and S is a nonempty subset of the set $\{(x,y)|(x\in\{1,2,\ldots,L\}, y\in\{1,2,\ldots,R\})\}$.

In this embodiment of this application, the foregoing three indication manners of the first indication information may be used separately, or may be used in a combination manner of at least two indication manners. The combination manner of the foregoing indication manners means that at least two of the foregoing information are reported. For example, the first indication information may include $P_{i,j}$ and $\Sigma_{(i,j)\in S}P_{i,j}$, that is, the first indication information may be used to indicate the quantity of the elements in each vector $D_{i,j}$, or may be used to indicate the sum of quantities of all the elements in the vector $D_{i,j}$. Other combinations are not exhaustively listed here.

It should be noted that the hierarchical reporting manner in the foregoing third manner is a preferred implementation, and this helps the base station demodulate data of each layer after receiving the third indication information. In addition, in specific implementation, reporting may alternatively be performed in a non-hierarchical manner, that is, reporting is performed in the foregoing first manner and/or second manner.

In addition, in specific implementation, considering that the second indication information may be used to indicate a plurality of vectors $D_{i,j}$, for ease of processing, in a feasible implementation scenario, the method may further include the following step:

The terminal device sends sixth indication information, where the sixth indication information is used to indicate a quantity of the vectors $D_{i,j}$, where (i,j)∈S or (i,j)∈S and j=q are satisfied, and S is a nonempty subset of the set $\{(x,y)|(x\in\{1,2,\ldots,L\}, y\in\{1,2,\ldots,R\})\}$. The meaning of the set $\{(x,y)|(x\in\{1,2,\ldots,L\}, y\in\{1,2,\ldots,R\})\}$ is described in the foregoing paragraph.

This implementation may be used in combination with any indication manner of the first indication information. For example, the first indication information is used to indicate the quantity $P_{i,j}$ of the elements in the vector $D_{i,j}$, and the sixth indication information is used to indicate the quantity of the vectors $D_{i,j}$. In this case, $\Sigma_{(i,j)\in S}P_{i,j}$ may be obtained through the quantity $P_{i,j}$ of the elements in the vector $D_{i,j}$ and the quantity of the vectors $D_{i,j}$.

In specific implementation, the sixth indication information and the third indication information may be sent simultaneously. In addition, in a preferred implementation scenario, if the third indication information is the CSI, the sixth indication information may be carried in the part 1 CSI in the third indication information. In this case, the terminal device needs to send only one piece of third indication information.

In other words, in a possible implementation, the sixth indication information is placed in the first part of the CSI (the part 1 CSI), and the first indication information and the second indication information are placed in the second part of the CSI (the part 2 CSI), where the sixth indication information is used to indicate a quantity of $P_{i,j}$ in the first indication information. The first indication information may include a bitmap. The bitmap is used to determine positions of elements in $D_{i,j}$ in all sample points of a transform domain, or positions of frequency-domain sub-bands determined by the terminal device.

In addition, for a specific implementation scenario of CSI compression, this application provides the following two feasible CSI compression solutions.

In a first CSI compression solution, the terminal device reports only an inflection point of each coefficient in frequency domain based on a position of each coefficient in $W_2^{(k)}$ in frequency domain.

In this case, according to different representation meanings of the matrix $V_{i,j}$ and that the vector $D_{i,j}$ and the matrix $F_{i,j}$ satisfy $V_{i,j}=F_{i,j} \times D_{i,j}$, the $P_{i,j}$ elements in the vector $D_{i,j}$ indicated in the second indication information may have at least the following representation relationships:

the $P_{i,j}$ elements in the vector $D_{i,j}$ are $P_{i,j}$ elements in $W_2^{(1)}(i,j)$, $W_2^{(2)}(i,j)$, ..., and $W_2^{(K)}(i,j)$, and the matrix $F_{i,j}$ is used to obtain $W_2^{(1)}(i,j)$, $W_2^{(2)}(i,j)$, ..., and $W_2^{(K)}(i,j)$ based on the $P_{i,j}$ elements in the vector $D_{i,j}$; or the $P_{i,j}$ elements in the vector $D_{i,j}$ are phases of $P_{i,j}$ elements in $W_2^{(1)}(i,j)$, $W_2^{(2)}(i,j)$, ..., and $W_2^{(K)}(i,j)$, and the matrix $F_{i,j}$ is used to obtain the phases of $W_2^{(1)}(i,j)$, $W_2^{(2)}(i,j)$, ..., and $W_2^{(K)}(i,j)$ based on the $P_{i,j}$ elements in the vector $D_{i,j}$; or the $P_{i,j}$ elements in the vector $D_{i,j}$ are amplitudes of $P_{i,j}$ elements in $W_2^{(1)}(i,j)$, $W_2^{(2)}(i,j)$, ..., and $W_2^{(K)}(i,j)$, and the matrix $F_{i,j}$ is used to obtain the amplitudes of $W_2^{(1)}(i,j)$, $W_2^{(2)}(i,j)$, ..., and $W_2^{(K)}(i,j)$ based on the $P_{i,j}$ elements in the vector $D_{i,j}$.

For example, when the $P_{i,j}$ elements in the vector $D_{i,j}$ are the phases of the $P_{i,j}$ elements in $W_2^{(1)}(i,j)$, $W_2^{(2)}(i,j)$, ..., and $W_2^{(K)}(i,j)$, FIG. 3 shows a curve of a frequency-domain relationship between a phase ($c_{i,j}$) and a sub-band number of each vector $D_{i,j}$. As shown in FIG. 3, each vector $D_{i,j}$ corresponds to one coefficient, that is, corresponds to one $c_{i,j}$. For example, a curve 1 in FIG. 3 shows that a coefficient $c_{1,1}$ has inflection points at sub-band numbers 0, 3, 8, and 12. In this case, a vector $D_{1,1}$ corresponding to the coefficient $c_{1,1}$ includes four elements in total: phases at the sub-band numbers 0, 3, 8, and 12. For another example, a curve 2 in FIG. 3 shows that a coefficient $c_{2,1}$ has inflection points at sub-band numbers 0, 4, 9, and 12. In this case, a vector $D_{2,1}$ corresponding to the coefficient $c_{2,1}$ includes four elements in total: phases at the sub-band numbers 0, 4, 9, and 12. For another example, a curve 3 in FIG. 3 shows that a coefficient $c_{3,2}$ has inflection points at sub-band numbers 0, 8, and 12. In this case, a vector $D_{3,2}$ corresponding to the coefficient $c_{3,2}$ includes three elements in total: phases at the sub-band numbers 0, 6, and 12.

In the foregoing precoding matrix indication solution, based on a reported element that is of each coefficient and that is located at an inflection point, another element that is not reported and that is of the coefficient can be conveniently obtained based on a linear relationship. Therefore, only a limited quantity of elements that are located at inflection points and that are in a curve of a frequency-domain relationship are used to represent the coefficient, and not all elements of the coefficient need to be reported. This can further greatly reduce an amount of data reported by the terminal device.

In this implementation, the matrix $F_{i,j}$ is used to obtain the matrix $V_{i,j}$ based on the $P_{i,j}$ elements in the vector $D_{i,j}$. In this case, the matrix $F_{i,j}$ may be an interpolation matrix, and is mainly used to obtain a precoding matrix (or an amplitude or a phase of the precoding matrix) on each sub-band by performing interpolation on the elements in the vector $D_{i,j}$.

In this embodiment of this application, the following method is further provided:

The terminal device sends fourth indication information, where the fourth indication information is used to indicate frequency-domain positions of the $P_{i,j}$ elements in $W_2^{(1)}(i,j)$, $W_2^{(2)}(i,j)$, ..., and $W_2^{(K)}(i,j)$ that correspond to the $P_{i,j}$ elements in $D_{i,j}$.

Using the curve 1 shown in FIG. 3 as an example, the vector $D_{1,1}$ corresponding to the curve 1 includes four elements in total, which are the phases at 0, 3, 8, and 12. The second indication information in the third indication information may include phase values of the four elements included in the vector $D_{1,1}$, and the first indication information may indicate that a quantity of the elements indicated by the vector $D_{1,1}$ is 4. In addition, a sub-band number (0, 3, 8, or 12) corresponding to each element may be further indicated through the fourth indication information.

In specific implementation, the fourth indication information and the third indication information may be sent simultaneously. In addition, in a preferred implementation scenario, if the third indication information is the CSI, the fourth indication information may be carried in the part 2 CSI in the third indication information. In this case, the terminal device needs to send only one piece of third indication information.

In addition, in this implementation, the third indication information may further include the foregoing sixth indication information. In this case, the sixth indication information is specifically used to indicate a quantity of coefficients reported in FIG. 3.

In a second CSI compression solution, the terminal device processes each coefficient in $W_2^{(k)}$, and separately selects a limited quantity of elements from each processed coefficient for reporting. Transform processing in this embodiment of this application may include but is not limited to transform processing from a frequency domain to a time domain, or cosine-related transform processing.

In this case, $P_{i,j}$ vectors of the matrix $F_{i,j}$ are orthogonal to each other. Specifically, the matrix $F_{i,j}$ may be:

$P_{i,j}$ columns of a discrete Fourier transform (DFT) matrix; or $P_{i,j}$ columns of an inverse discrete Fourier transform (IDFT) matrix; or $P_{i,j}$ columns of a discrete cosine transform (DCT) matrix; or $P_{i,j}$ columns of an inverse discrete cosine transform (IDCT) matrix.

In this case, the precoding matrix indication method provided in this application further includes the following step:

The terminal device sends fifth indication information, where the fifth indication information is used to indicate the matrix $F_{i,j}$. In a possible implementation, the fifth indication information is used to indicate $P_{i,j}$ columns of a transform matrix, and the transform matrix includes but is not limited to the DFT matrix, the IDFT matrix, the DCT matrix, and the IDFT matrix.

In specific implementation, the fifth indication information and the third indication information may be sent simultaneously. In addition, in a preferred implementation scenario, if the third indication information is the CSI, the fifth indication information may be carried in the part 2 CSI in the third indication information. In this case, the terminal device needs to send only one piece of third indication information.

Figure 4:
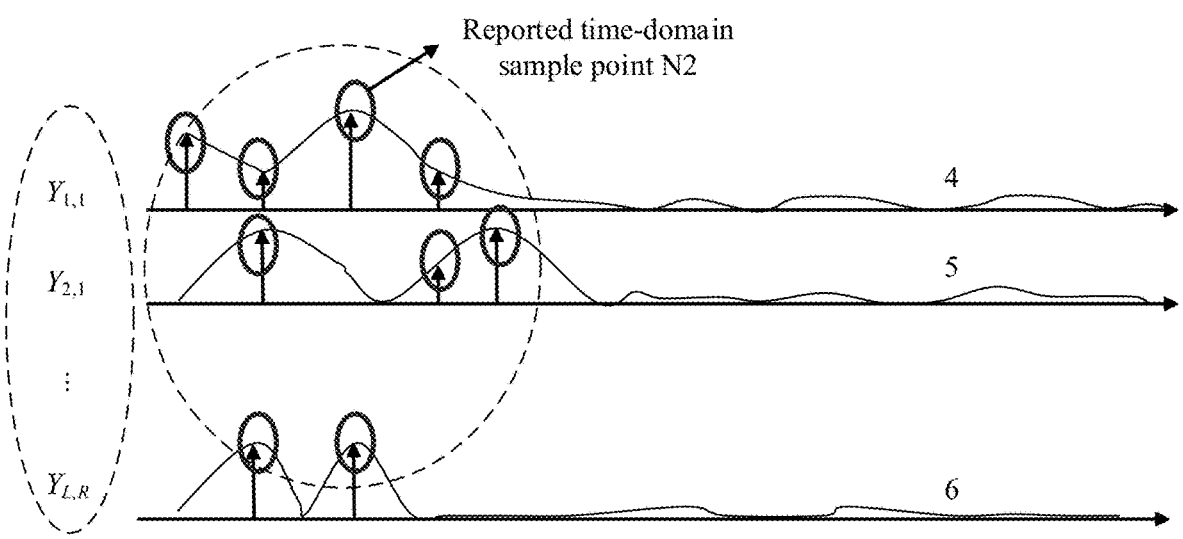
FIG. 4 is a curve of a time-domain relationship obtained after IDFT transform is performed on coefficients in $W_2^{(k)}$ according to this application.

Specifically, the following uses an example in which the matrix $F_{i,j}$ is an IDFT matrix for specific description. Referring to Table 2 and FIG. 4, FIG. 4 shows a curve of a time-domain relationship obtained after IDFT transform is performed on coefficients in $W_2^{(k)}$. In FIG. 4, in each transform, $Y_{i,j}$ in time domain corresponds to one time-domain relationship curve. The first indication information is used to indicate some time-domain sample points in each time-domain relationship curve. These time-domain sample points are circled in FIG. 4, and a total quantity of these time-domain sample points in FIG. 4 is identified as N2, where N2 may be a total quantity of sample points of all coefficients in $W_2^{(k)}$ in time domain, or may be a total quantity of time-domain sample points of all coefficients at each layer in $W_2^{(k)}$. A quantity of time-domain sample points reported in each coefficient may be the same or different, and the reported time-domain sample points may be selected based on a preset condition as required or determined by processing personnel through processing. This is not particularly limited in this application. For example, a curve 4 corresponding to a coefficient $Y_{1,1}$ includes four time-domain sample points that need to be reported in total. In this case, the second indication information is used to indicate the four time-domain sample points corresponding to the coefficient $Y_{1,1}$, and the first indication information is used to indicate that a quantity of the time-domain sample points reported in the second indication information is 4.

In a preferred implementation scenario, some time-domain sample points reported in each coefficient are a limited quantity of time-domain sample points with a relatively large value.

In addition, in this implementation, in addition to the quantity N2 indicated by the first indication information, the third indication information may further include the foregoing sixth indication information. In this case, the sixth indication information is specifically used to indicate a quantity of coefficients reported in FIG. 4, that is, a quantity N1 shown in FIG. 4.

For the two CSI compression manners shown in FIG. 3 and FIG. 4, this embodiment of this application further provides indication manners of the fourth indication information and the fifth indication information. The fourth indication information and the fifth indication information may be carried in the first indication information. For ease of description, the following uses FIG. 4 and the fifth indication information as an example to describe representation manners of the fourth indication information and the fifth indication information.

This embodiment of this application provides two manners of representing the fifth indication information:

A first representation manner is a bitmap manner. In this case, for the fifth indication information and for each non-zero wideband amplitude coefficient $Y_{i,j}$, a position of a reported element in the coefficient may be indicated through a bit group of one or more bits.

In a preferred implementation scenario, the first indication information includes one or more bitmaps, and each bitmap includes K bits, and is used to indicate position indexes of the $P_{i,j}$ elements in the vector $D_{i,j}$. In this case, the fifth indication information is carried in the first indication information.

In another possible implementation, a sample point of the transform domain may be obtained in an oversampling manner. In this case, a quantity of sample points of the transform domain is greater than a quantity K of sub-bands. In this manner, each of the bitmaps included in the first indication information includes J bits, to indicate positions of the $P_{i,j}$ elements in the vector $D_{i,j}$ in J sample points of the transform domain, where J>K.

With reference to FIG. 4 and the fifth indication information, in this case, a bit group corresponding to each coefficient $Y_{i,j}$ may be represented in Table 3.

TABLE 3

| Coefficient | Bit group corresponding to the coefficient |
| --- | --- |
| $Y_{1,1}$ | [1 1 1 1 0 0 0 . . . 0] |
| $Y_{2,1}$ | [0 1 0 1 1 0 0 . . . 0] |
| . . . | . . . |
| $Y_{L,R}$ | [0 1 0 1 0 0 0 . . . 0] |

A second representation manner is a combinatorial number manner.

FIG. 4 and the fifth indication information are still used as an example. A quantity of reported elements corresponding to the coefficient $Y_{1,1}$ is 4, and positions of these reported elements may be reported in the combinatorial number manner: Four sample points $C_N^4$ are selected from N sample points. A quantity of reported elements corresponding to the coefficient $Y_{2,1}$ is 3, and positions of these reported elements may be reported in the combinatorial number manner: Three sample points $C_N^3$ are selected from N sample points. A quantity of reported elements corresponding to the coefficient $Y_{L,R}$ is 2, and positions of these reported elements may be reported in the combinatorial number manner: Two sample points $C_N^2$ are selected from N sample points.

It should be noted that when the fifth indication information is reported in the combinatorial number manner, because a quantity of bits that carry $C_N^m$ is related to m, but a value of m is not indicated in the part 1 CSI, to resolve this problem, a zero padding manner may be used to fix a quantity of bits of the part 2 CSI. In this case, the method further includes the following steps:

The terminal obtains combinatorial number information.

The terminal performs padding processing on the combinatorial number information, to obtain padded combinatorial number information, where the padded combinatorial number information has a fixed quantity of bits.

For example, if a quantity of bits used to carry an element position is fixed at log $2(C_N^4)$, for the coefficient $Y_{1,1}$, 0 does not need to be added; for the coefficient $Y_{2,1}$, one bit whose value is 0 needs to be added; and for the coefficient $Y_{L,R}$, two bits whose values are both 0 need to be added.

In addition to the precoding matrix indication method performed on a terminal side, this application further provides a method performed on the terminal side.

Figure 5:
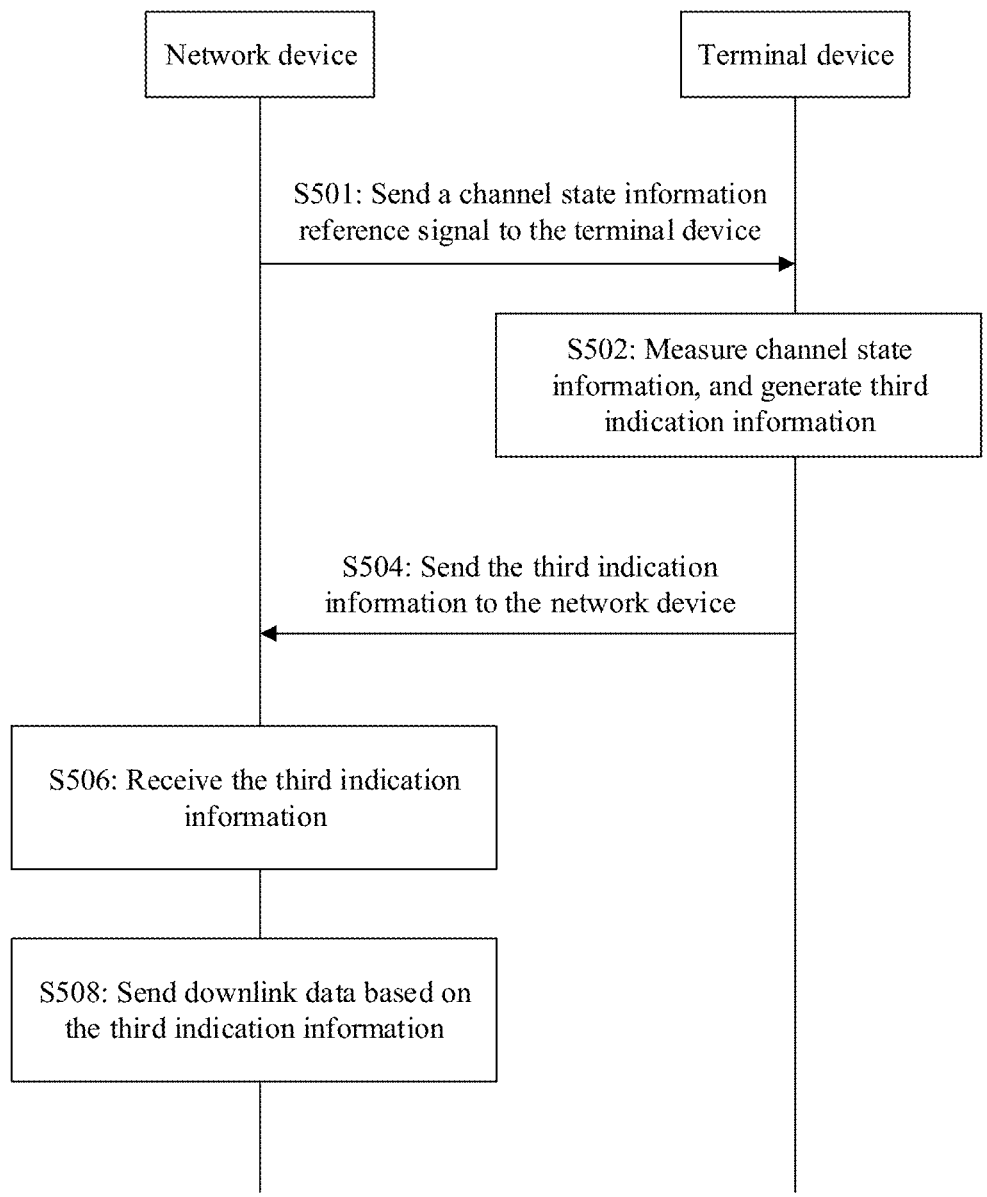
FIG. 5 is a schematic interaction flowchart of a precoding matrix indication method according to this application.

FIG. 5 is a schematic interaction flowchart of a precoding matrix indication method in an application scenario of CSI reporting according to this application. As shown in FIG. 5, the method includes the following steps.

S502: A terminal device generates third indication information.

S504: The terminal device sends the third indication information to a network device.

S506: The network device receives the third indication information.

S508: The network device sends downlink data based on the third indication information.

It should be noted that, as described above, the third indication information received by the network device may include first indication information and second indication information. In addition, in some possible implementation scenarios, at least one of fourth indication information, fifth indication information, and sixth indication information may be further included. Description of the third indication information is the same as the foregoing content, and details are not described again.

In addition, in a feasible onsite scenario, in the procedure shown in FIG. 5, a network device side may further include the following method.

S501: The network device sends a channel state information reference signal (CSI-Reference Signal, CSI-RS) to the terminal device.

In this implementation scenario, that the terminal device generates the third indication information is triggered after the terminal device receives the CSI-RS sent by the network device. This is a possible implementation scenario, and is not intended to limit this application.

It may be understood that some or all of the steps or operations in the foregoing embodiment are merely examples. Other operations or variations of various operations may be further performed in this embodiment of this application. In addition, the steps may be performed in a sequence different from that presented in the foregoing embodiment, and not all operations in the foregoing embodiment may need to be performed.

It may be understood that, in the foregoing embodiments, an operation or a step implemented by the terminal device may also be implemented by a component (for example, a chip or a circuit) that can be used in the terminal device, an operation or a step implemented by the core network node may also be implemented by a component (for example, a chip or a circuit) that can be used in the core network node, and an operation or a step implemented by the network device may also be implemented by a component (for example, a chip or a circuit) that can be used in the network device.

It may be understood that, in the foregoing embodiments, an operation or a step implemented by the terminal may also be implemented by a component (for example, a chip or a circuit) that can be used in the terminal, an operation or a step implemented by the core network node may also be implemented by a component (for example, a chip or a circuit) that can be used in the core network node, and an operation or a step implemented by the network device may also be implemented by a component (for example, a chip or a circuit) that can be used in the network device.

Figure 6:
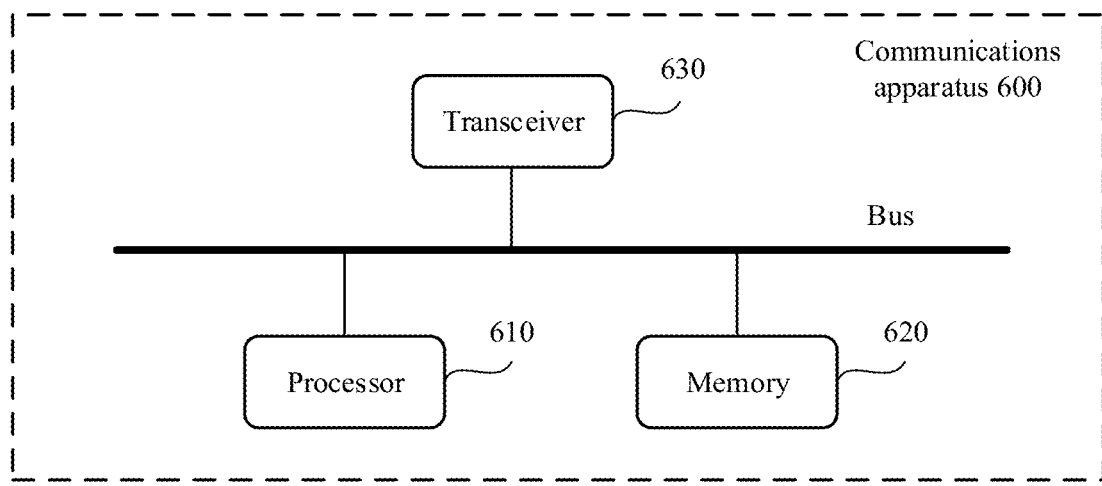
FIG. 6 is a structural block diagram of a communications apparatus according to this application.

FIG. 6 is a schematic structural diagram of a communications apparatus. The communications apparatus may be configured to implement the method corresponding to the network device, a method corresponding to a position determining entity, a method corresponding to a terminal, or a method corresponding to a target LMU described in the foregoing method embodiments. For details, refer to the descriptions in the foregoing method embodiments.

The communications apparatus 600 may include one or more processors 610. The processor 610 may also be referred to as a processing unit, and may implement a specific control function. The processor 610 may be a general purpose processor, a dedicated processor, or the like.

In an optional design, the processor 610 may also store a first instruction, and the first instruction may be run by the processor, so that the communications apparatus 600 performs the method that corresponds to the network device or the terminal device and that is described in the foregoing method embodiments.

A processing element may be a general purpose processor, for example, a central processing unit (CPU), or may be configured as one or more integrated circuits that perform the foregoing methods, for example, one or more application-specific integrated circuits (ASIC), one or more microprocessors (digital signal processor, DSP), or one or more field programmable gate arrays (FPGA). A storage element may be one memory, or may be a general term of a plurality of storage elements.

In another possible design, the communications apparatus 600 may include a circuit. The circuit may implement a sending, receiving, or communication function in the foregoing method embodiments.

Optionally, the communications apparatus 600 may include one or more memories 620, the memory 620 stores a second instruction or intermediate data, and the second instruction may be run on the processor, so that the communications apparatus 600 performs the method described in the foregoing method embodiments. Optionally, the memory may further store other related data. Optionally, the processor may also store instructions and/or data. The processor and the memory may be separately disposed, or may be integrated together.

Optionally, the communications apparatus 600 may further include a transceiver 630. The transceiver 630 may be referred to as a transceiver unit, a transceiver machine, a transceiver circuit, a transceiver, or the like, and is configured to implement sending and receiving functions of the communications apparatus.

In the communications apparatus 600, the processor 610, the memory 620, and the transceiver 630 are connected through a bus.

If the communications apparatus 600 is configured to implement an operation corresponding to the terminal device in the embodiments shown in FIG. 2 and FIG. 5, the processor may be configured to generate third indication information, and the transceiver may be further configured to send the third indication information. The transceiver may further complete another corresponding communication function. The processor is configured to complete a corresponding determining or control operation, and optionally, may further store corresponding instructions in the memory. For a specific processing manner of each component, refer to related descriptions in the foregoing embodiments.

If the communications apparatus 600 is configured to implement an operation corresponding to the network device in FIG. 5, the transceiver may receive the third indication information sent by the terminal device, and the processor may implement the step of sending downlink data based on the third indication information. The transceiver may further complete another corresponding communication function. The processor is configured to complete a corresponding determining or control operation, and optionally, may further store corresponding instructions in the memory. For a specific processing manner of each component, refer to related descriptions in the foregoing embodiments.

The processor and the transceiver described in this application may be implemented on an integrated circuit (IC), an analog IC, a radio frequency integrated circuit RFIC, a hybrid signal IC, an application-specific integrated circuit (ASIC), a printed circuit board (PCB), an electronic device, or the like. The processor and the transceiver may also be manufactured through various 1C technologies, for example, a complementary metal oxide semiconductor (CMOS), an N-type metal oxide semiconductor (NMOS), a P-type metal oxide semiconductor PMOS), a bipolar junction transistor (BJT), a bipolar CMOS (BiCMOS), silicon germanium (SiGe), and gallium arsenide (GaAs).

Optionally, the communications apparatus may be an independent device or may be a part of a relatively large device. For example, the device may be:

(1) an independent integrated circuit IC, a chip, or a chip system or subsystem;

(2) a set having one or more ICs, where optionally, the IC set may also include a storage component configured to store data and/or instructions;

(3) an ASIC, for example, a modem (MSM);

(4) a module that can be embedded in another device;

(5) a receiver, a terminal, a cellular phone, a wireless device, a handheld phone, a mobile unit, a network device, or the like; or (6) another device or the like.

Figure 7:
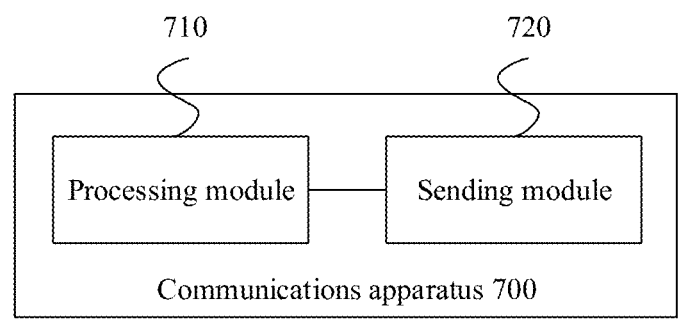
FIG. 7 is a schematic structural diagram of another communications apparatus according to this application.

In addition, FIG. 7 is a schematic structural diagram of a communications apparatus according to an embodiment of this application. As shown in FIG. 7, the communications apparatus 700 includes a processing module 710 and a sending module 720. The processing module 710 is configured to generate third indication information, where the third indication information is used to indicate $W_2^{(1)}$, $W_2^{(2)}$, ..., and $W_2^{(K)}$, where $W^{(k)}$ is a precoding matrix in a $k^{th}$ frequency-domain unit, $W^{(k)}$ satisfies $W^{(k)}=W_1 \times W_2^{(k)}$, $W_1$ is an $N_t \times L$ matrix, $W_2^{(k)}$ is an $L \times R$ matrix, $0 < k \leq K$, and $K$ is a quantity of frequency-domain units; the third indication information includes second indication information and first indication information; the second indication information is used to indicate $P_{i,j}$ elements in a vector $D_{i,j}$, where the vector $D_{i,j}$ and a matrix $F_{i,j}$ satisfy $V_{i,j}=F_{i,j} \times D_{i,j}$, the vector $V_{i,j}$ corresponds to $W_2^{(1)}(i,j)$, $W_2^{(2)}(i,j)$, ..., and $W_2^{(K)}(i,j)$, $W_2^{(k)}(i,j)$ is a complex number in an $i^{th}$ row and a $j^{th}$ column of the matrix $W_2^{(k)}$, and $F_{i,j}$ is a $K \times P_{i,j}$ matrix, where $0 < i \leq L$, $0 < j \leq R$, and $P_{i,j} < K$; and the first indication information is used to indicate a quantity of the elements indicated by the second indication information; and the sending module 720 is configured to send the third indication information.

According to the solution provided in this embodiment, a quantity of elements reported in the precoding matrix is reported, so that a network device that receives the third indication information can decode CSI based on the information, and a terminal device can dynamically adjust the quantity of the reported elements based on a channel condition. This reduces resource overheads required for CSI reporting.

In a possible design, that the vector $V_{i,j}$ corresponds to $W_2^{(1)}(i,j)$, $W_2^{(2)}(i,j)$, ..., and $W_2^{(K)}(i,j)$ includes: $V_{i,j}$ is a column vector including $W_2^{(1)}(i,j)$, $W_2^{(2)}(i,j)$, ..., and $W_2^{(K)}(i,j)$; or $V_{i,j}$ is a column vector including amplitudes of $W_2^{(1)}(i,j)$, $W_2^{(2)}(i,j)$, ... and $W_2^{(K)}(i,j)$; or $V_{i,j}$ is a column vector including phases of $W_2^{(1)}(i,j)$, $W_2^{(2)}(i,j)$, ..., and $W_2^{(K)}(i,j)$. The vector $V_{i,j}$ may be represented as $V_{i,j}=[\alpha_{i,j}^1 \ldots \alpha_{i,j}^K]^T$, where $\alpha_{i,j}^k$ is $W_2^{(k)}(i,j)$, or an amplitude of $W_2^{(k)}(i,j)$, or a phase of $W_2^{(k)}(i,j)$.

In a possible design, the quantity of the elements indicated by the second indication information includes $P_{i,j}$ or $P_{i,j}-1$, and $(i,j) \in S$, where $S$ is a nonempty subset of a set $\{(x,y) | (x \in \{1,2,\ldots,L\}, y \in \{1,2,\ldots,R\})\}$.

The set $S$ represents value ranges of $i$ and $j$ in the vector $D_{i,j}$ that needs to be reported by the terminal device. It should be noted that each matrix of the matrices $W_2^{(1)}$, $W_2^{(2)}$, ..., and $W_2^{(K)}$ is a matrix with $L$ rows and $R$ columns. However, in the $K$ $L \times R$ matrices, amplitudes of some elements are 0, and the terminal device may not report $D_{i,j}$ corresponding to the element whose amplitude is 0. Therefore, values of $i$ and $j$ are a nonempty subset of the set $\{(x,y) | (x \in \{1,2,\ldots,L\}, y \in \{1,2,\ldots,R\})\}$. A value set of $(x,y)$ in $\{(x,y) | (x \in \{1,2,\ldots,L\}, y \in \{1,2,\ldots,R\})\}$ is $(1,1)$, $(1,2)$, ..., $(1,R)$, $(2,1)$, $(2,2)$, ..., $(2,R)$, ..., $(L, 1)$, $(L, 2)$, ..., and $(L, R)$.

According to the solution provided in this embodiment, a quantity of elements in each vector $D_{i,j}$ is reported, so that the quantity of the reported elements in the precoding matrix is indicated, thereby avoiding abnormal data transmission.

In a possible design, the quantity of the elements indicated by the second indication information includes: $\Sigma_{(i,j) \in S} P_{i,j}$ or $\Sigma_{(i,j) \in S}(P_{i,j}-1)$, where $S$ is a nonempty subset of a set $\{(x,y) | (x \in \{1,2,\ldots,L\}, y \in \{1,2,\ldots,R\})\}$.

The meaning of the set $\{(x,y) | (x \in \{1,2,\ldots,L\}, y \in \{1,2,\ldots,R\})\}$ is described in the foregoing paragraph. According to the solution provided in this embodiment, a total quantity of the reported elements in the precoding matrix is directly indicated, so that an amount of data reported by the terminal device can be reduced on a basis that the network device can demodulate the CSI.

In a possible design, the quantity of the elements indicated by the second indication information includes $P_q$, where $P_q$ is a sum of the quantity $P_{i,j}$ of the elements when $j=q$ is given: $P_q = \Sigma_{j=q \text{ and } (i,j) \in S} P_{i,j}$ or $P_q = \Sigma_{j=q \text{ and } (i,j) \in S}(P_{i,j}-1)$, and $S$ is a nonempty subset of a set $\{(x,y) | (x \in \{1,2,\ldots,L\}, y \in \{1,2,\ldots,R\})\}$.

The meaning of the set $\{(x,y) | (x \in \{1,2,\ldots,L\}, y \in \{1,2,\ldots,R\})\}$ is described in the foregoing paragraph. In the solution provided in this embodiment, each $j$ corresponds to a layer of the precoding matrix, so that the solution is used by the terminal device to report a quantity of reported elements corresponding to each layer. This hierarchical reporting manner helps improve a CSI demodulation rate of the network device.

In a possible design, the $P_{i,j}$ elements in the vector $D_{i,j}$ are $P_{i,j}$ elements in $W_2^{(1)}(i,j)$, $W_2^{(2)}(i,j)$, ..., and $W_2^{(K)}(i,j)$, and the matrix $F_{i,j}$ is used to obtain $W_2^{(1)}(i,j)$, $W_2^{(2)}(i,j)$, ..., and $W_2^{(K)}(i,j)$ based on the $P_{i,j}$ elements in the vector $D_{i,j}$; or the $P_{i,j}$ elements in the vector $D_{i,j}$ are phases of $P_{i,j}$ elements in $W_2^{(1)}(i,j)$, $W_2^{(2)}(i,j)$, ..., and $W_2^{(K)}(i,j)$, and the matrix $F_{i,j}$ is used to obtain the phases of $W_2^{(1)}(i,j)$, $W_2^{(2)}(i,j)$, ..., and $W_2^{(K)}(i,j)$ based on the $P_{i,j}$ elements in the vector $D_{i,j}$; or the $P_{i,j}$ elements in the vector $D_{i,j}$ are amplitudes of $P_{i,j}$ elements in $W_2^{(1)}(i,j)$, $W_2^{(2)}(i,j)$, ..., and $W_2^{(K)}(i,j)$, and the matrix $F_{i,j}$ is used to obtain the amplitudes of $W_2^{(1)}(i,j)$, $W_2^{(2)}(i,j)$, ..., and $W_2^{(K)}(i,j)$ based on the $P_{i,j}$ elements in the vector $D_{i,j}$.

In this case, the sending module 720 is further configured to send fourth indication information, where the fourth indication information is used to indicate frequency-domain positions of the $P_{i,j}$ elements in $W_2^{(1)}(i,j)$, $W_2^{(2)}(i,j)$, ..., and $W_2^{(K)}(i,j)$ that correspond to the $P_{i,j}$ elements in the vector $D_{i,j}$.

According to the solution provided in this embodiment, not all coefficients in $W_2^{(k)}$ need to be reported, and only an element at an inflection point that can represent a frequency-domain position of $W_2^{(k)}$ needs to be reported, thereby greatly reducing an amount of data reported by the terminal device.

In another possible design, $P_{i,j}$ vectors of the matrix $F_{i,j}$ are orthogonal to each other.

In this case, the sending module 720 is further configured to send fifth indication information, where the fifth indication information is used to indicate the matrix $F_{i,j}$.

According to the solution provided in this embodiment, matrix transformation may be performed on coefficients in frequency domain, and a limited quantity of sample points with a relatively large value are selected, from results obtained after the matrix transformation, for reporting. In this way, the amount of data reported by the terminal device is reduced.

In another possible design, the sending module 720 is further configured to send sixth indication information, where the sixth indication information is used to indicate a quantity of the vectors $D_{i,j}$, where $(i,j) \in S$ or i,j satisfy $(i,j) \in S$ and j=k, and S is a nonempty subset of the set $\{(x,y) | (x \in \{1, 2, \ldots, L\}, y \in \{1,2, \ldots, R\})\}$. The meaning of the set $\{(x,y) | (x \in \{1,2, \ldots, L\}, y \in \{1,2, \ldots, R\})\}$ is described in the foregoing paragraph.

In another possible design, the first indication information includes one or more bitmaps; and each bitmap is used to indicate positions of the $P_{i,j}$ elements in the vector $D_{i,j}$.

In this embodiment, the first indication information includes one bitmap, so that the bitmap is used to indicate position information of elements in all reported vectors $D_{i,j}$ in K positions. Alternatively, the first indication information includes R bitmaps, and the bitmaps are used to indicate position information, in K positions, of elements in vectors $D_{i,j}$ whose value of j is 1, 2, ..., or R in all reported vectors $D_{i,j}$. Alternatively, the first indication information includes L×R or (L−1)×R bitmaps, and the bitmaps are used to indicate position information, in K positions, of an element that is in $D_{i,j}$ and that corresponds to each element in $W_2$ or each element other than an element corresponding to a largest amplitude in each column of $W_2$.

According to the solution provided in this embodiment, when the quantity of the reported elements is indicated, a position of the reported element may be indicated, and the position of the reported element does not need to be indicated in another manner. This manner has relatively high flexibility and scalability.

In another possible design, the third indication information is channel state information CSI, and the CSI includes: a first part, part 1 CSI, including the first indication information, a rank indicator RI, and a channel quality indicator CQI that corresponds to a first codeword; and a second part, part 2 CSI, including the second indication information, where the part 1 CSI and the part 2 CSI are independently encoded. In this way, the part 1 CSI may indicate a quantity of bits in the part 2 CSI, so that the network device that receives the third indication information can decode the CSI based on the information, thereby avoiding abnormal data transmission.

Figure 8:
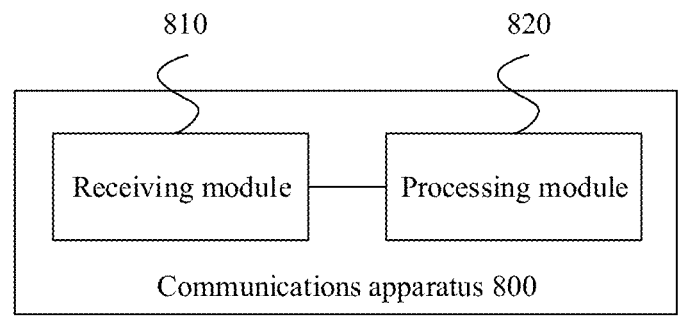
FIG. 8 is a schematic structural diagram of another communications apparatus according to this application.

In addition, FIG. 8 is a schematic structural diagram of a communications apparatus according to an embodiment of this application. As shown in FIG. 8, the communications apparatus 800 includes a receiving module 810 and a processing module 820. The receiving module 810 is configured to receive third indication information, where the third indication information is used to indicate $W_2^{(1)}$, $W_2^{(2)}$, ..., and $W_2^{(K)}$, where $W^{(k)}$ is a precoding matrix in a $k^{th}$ frequency-domain unit, $W^{(k)}$ satisfies $W^{(k)} = W_1 \times W_2^{(k)}$, $W_1$ is an $N_t \times L$ matrix, $W_2^{(k)}$ is an L×R matrix, $0 < k \leq K$, and K is a quantity of frequency-domain units; the third indication information includes second indication information and first indication information; the second indication information is used to indicate $P_{i,j}$ elements in a vector $D_{i,j}$, where the vector $D_{i,j}$ and a matrix $F_{i,j}$ satisfy $V_{i,j} = F_{i,j} \times D_{i,j}$, the vector $V_{i,j}$ corresponds to $W_2^{(1)}(i,j)$, $W_2^{(2)}(i,j)$, ..., and $W_2^{(K)}(i,j)$, $W_2^{(k)}(i,j)$ is a complex number in an $i^{th}$ row and a $j^{th}$ column of the matrix $W_2^{(k)}$, and $F_{i,j}$ is a $K \times P_{i,j}$ matrix, where $0 < i \leq L$, $0 < j \leq R$, and $P_{i,j} < K$; and the first indication information is used to indicate a quantity of the elements indicated by the second indication information; and the processing module 820 is configured to send downlink data based on the third indication information.

According to the solution provided in this embodiment, a quantity of elements reported in the precoding matrix is reported, so that a network device that receives the third indication information can decode CSI based on the information, and a terminal device can dynamically adjust the quantity of the reported elements based on a channel condition. This reduces resource overheads required for CSI reporting.

In a possible design, that the vector $V_{i,j}$ corresponds to $W_2^{(1)}(i,j)$, $W_2^{(2)}(i,j)$, ..., and $W_2^{(K)}(i,j)$ includes: $V_{i,j}$ is a column vector including $W_2^{(1)}(i,j)$, $W_2^{(2)}(i,j)$, ..., and $W_2^{(K)}(i,j)$; or $V_{i,j}$ is a column vector including amplitudes of $W_2^{(1)}(i,j)$, $W_2^{(2)}(i,j)$, ... and $W_2^{(K)}(i,j)$; or $V_{i,j}$ is a column vector including phases of $W_2^{(1)}(i,j)$, $W_2^{(2)}(i,j)$, ..., and $W_2^{(K)}(i,j)$. The vector $V_{i,j}$ may be represented as $V_{i,j} = [\alpha_{i,j}^1 \ldots \alpha_{i,j}^K]^T$, where $\alpha_{i,j}^k$ is $W_2^{(k)}(i,j)$, or an amplitude of $W_2^{(k)}(i,j)$, or a phase of $W_2^{(k)}(i,j)$.

In a possible design, the quantity of the elements indicated by the second indication information includes $P_{i,j}$ or $P_{i,j} - 1$, and $(i,j) \in S$, where S is a nonempty subset of a set $\{(x,y) | (x \in \{1,2, \ldots, L\}, y \in \{1,2, \ldots, R\})\}$.

The set S represents value ranges of i and j in the vector $D_{i,j}$ that needs to be reported by the terminal device. It should be noted that each matrix of the matrices $W_2^{(1)}$, $W_2^{(2)}$, ..., and $W_2^{(K)}$ is a matrix with L rows and R columns. However, in the K L×R matrices, amplitudes of some elements are 0, and the terminal device may not report $D_{i,j}$ corresponding to the element whose amplitude is 0. Therefore, values of i and j are a nonempty subset of the set $\{(x,y) | (x \in \{1,2, \ldots, L\}, y \in \{1,2, \ldots, R\})\}$. A value set of (x,y) in $\{(x,y) | (x \in \{1, 2, \ldots, L\}, y \in \{1,2, \ldots, R\})\}$ is (1,1), (1,2), ..., (1,R), (2,1), (2,2), ..., (2,R), ..., (L,1), (L,2), ..., and (L,R).

According to the solution provided in this embodiment, a quantity of elements in each vector $D_{i,j}$ is reported, so that the quantity of the reported elements in the precoding matrix is indicated, thereby avoiding abnormal data transmission.

In a possible design, the quantity of the elements indicated by the second indication information includes: $\Sigma_{(i,j) \in S} P_{i,j}$ or $\Sigma_{(i,j) \in S}(P_{i,j} - 1)$, where S is a nonempty subset of a set $\{(x,y) | (x \in \{1,2, \ldots, L\}, y \in \{1,2, \ldots, R\})\}$.

The meaning of the set $\{(x,y) | (x \in \{1, 2, \ldots, L\}, y \in \{1,2, \ldots, R\})\}$ is described in the foregoing paragraph. According to the solution provided in this embodiment, a total quantity of the reported elements in the precoding matrix is directly indicated, so that an amount of data reported by the terminal device can be reduced on a basis that the network device can demodulate the CSI.

In a possible design, the quantity of the elements indicated by the second indication information includes $P_q$, where $P_q$ is a sum of the quantity $P_{i,j}$ of the elements when j=q is given: $P_q = \Sigma_{j=q \text{ and } (i,j) \in S} P_{i,j}$ or $P_q = \Sigma_{j=q \text{ and } (i,j) \in S}(P_{i,j} - 1)$, and S is a nonempty subset of a set $\{(x,y) | (x \in \{1,2, \ldots, L\}, y \in \{1,2, \ldots, R\})\}$.

The meaning of the set $\{(x,y) | (x \in \{1,2, \ldots, L\}, y \in \{1,2, \ldots, R\})\}$ is described in the foregoing paragraph. In the solution provided in this embodiment, each j corresponds to a layer of the precoding matrix, so that the solution is used by the terminal device to report a quantity of reported elements corresponding to each layer. This hierarchical reporting manner helps improve a CSI demodulation rate of the network device.

In a possible design, the $P_{i,j}$ elements in the vector $D_{i,j}$ are $P_{i,j}$ elements in $W_2^{(1)}(i,j), W_2^{(2)}(i,j), \ldots,$ and $W_2^{(K)}(i,j)$, and the matrix $F_{i,j}$ is used to obtain $W_2^{(1)}(i,j), W_2^{(2)}(i,j), \ldots,$ and $W_2^{(K)}(i,j)$ based on the $P_{i,j}$ elements in the vector $D_{i,j}$; or the $P_{i,j}$ elements in the vector $D_{i,j}$ are phases of $P_{i,j}$ elements in $W_2^{(1)}(i,j), W_2^{(2)}(i,j), \ldots,$ and $W_2^{(K)}(i,j)$, and the matrix $F_{i,j}$ is used to obtain the phases of $W_2^{(1)}(i,j), W_2^{(2)}(i,j), \ldots,$ and $W_2^{(K)}(i,j)$ based on the $P_{i,j}$ elements in the vector $D_{i,j}$; or the $P_{i,j}$ elements in the vector $D_{i,j}$ are amplitudes of $P_{i,j}$ elements in $W_2^{(1)}(i,j), W_2^{(2)}(i,j), \ldots,$ and $W_2^{(K)}(i,j)$, and the matrix $F_{i,j}$ is used to obtain the amplitudes of $W_2^{(1)}(i,j), W_2^{(2)}(i,j), \ldots,$ and $W_2^{(K)}(i,j)$ based on the $P_{i,j}$ elements in the vector $D_{i,j}$.

In this case, the receiving module 810 is further configured to receive fourth indication information, where the fourth indication information is used to indicate frequency-domain positions of the $P_{i,j}$ elements in $W_2^{(1)}(i,j), W_2^{(2)}(i,j), \ldots,$ and $W_2^{(K)}(i,j)$ that correspond to the $P_{i,j}$ elements in the vector $D_{i,j}$.

According to the solution provided in this embodiment, not all coefficients in $W_2^{(k)}$ need to be reported, and only an element at an inflection point that can represent a frequency-domain position of $W_2^{(k)}$ needs to be reported, thereby greatly reducing an amount of data reported by the terminal device.

In another possible design, $P_{i,j}$ vectors of the matrix $F_{i,j}$ are orthogonal to each other.

In this case, the receiving module 810 is further configured to receive fifth indication information, where the fifth indication information is used to indicate the matrix $F_{i,j}$.

According to the solution provided in this embodiment, matrix transformation may be performed on coefficients in frequency domain, and a limited quantity of sample points with a relatively large value are selected, from results obtained after the matrix transformation, for reporting. In this way, the amount of data reported by the terminal device is reduced.

In another possible design, the receiving module 810 is further configured to receive sixth indication information, where the sixth indication information is used to indicate a quantity of the vectors $D_{i,j}$, where (i,j)∈S or (i,j)∈S and j=q are satisfied, and S is a nonempty subset of the set $\{(x,y)| (x \in \{1,2,\ldots,L\}, y \in \{1,2,\ldots,R\})\}$. The meaning of the set $\{(x,y)|(x \in \{1,2,\ldots,L\}, y \in \{1,2,\ldots,R\})\}$ is described in the foregoing paragraph.

In another possible design, the first indication information includes one or more bitmaps; and each bitmap is used to indicate positions of the $P_{i,j}$ elements in the vector $D_{i,j}$.

In this embodiment, the first indication information includes one bitmap, so that the bitmap is used to indicate position information of elements in all reported vectors $D_{i,j}$ in K positions. Alternatively, the first indication information includes R bitmaps, and the bitmaps are used to indicate position information, in K positions, of elements in vectors $D_{i,j}$ whose value of j is 1, 2, . . . , or R in all reported vectors $D_{i,j}$. Alternatively, the first indication information includes L×R or (L−1)×R bitmaps, and the bitmaps are used to indicate position information, in K positions, of an element that is in $D_{i,j}$ and that corresponds to each element in $W_2$ or each element other than an element corresponding to a largest amplitude in each column of $W_2$.

According to the solution provided in this embodiment, when the quantity of the reported elements is indicated, a position of the reported element may be indicated, and the position of the reported element does not need to be indicated in another manner. This manner has relatively high flexibility and scalability.

In another possible design, the third indication information is channel state information CSI, and the CSI includes: a first part, part 1 CSI, including the first indication information, a rank indicator RI, and a channel quality indicator CQI that corresponds to a first codeword; and a second part, part 2 CSI, including the second indication information, where the part 1 CSI and the part 2 CSI are independently encoded. In this way, the part 1 CSI may indicate a quantity of bits in the part 2 CSI, so that the network device that receives the third indication information can decode the CSI based on the information, thereby avoiding abnormal data transmission.

It should be understood that division into the foregoing modules of the communications apparatus shown in FIG. 7 and FIG. 8 is merely logical function division. In actual implementation, all or some of the modules may be integrated into one physical entity, or may be physically separated. In addition, all of the modules may be implemented in a form of software invoked by a processing element or in a form of hardware. Alternatively, some of the modules may be implemented in a form of software invoked by a processing element, and some of the modules may be implemented in a form of hardware. For example, the processing module may be an independently disposed processing element, or may be integrated into a communications apparatus, for example, a chip of a network device for implementation. In addition, the processing module may be stored in a memory of the communications apparatus in a form of a program to be invoked by a processing element of the communications apparatus to perform a function of each of the foregoing modules. Implementations of other modules are similar. In addition, all or some of the modules may be integrated together, or may be implemented independently. The processing element described herein may be an integrated circuit with a signal processing capability. In an implementation process, steps in the method or the modules can be implemented by using a hardware integrated logic circuit in the processing element, or by using instructions in a form of software.

For example, the foregoing modules may be one or more integrated circuits configured to implement the foregoing methods, for example, one or more ASICs, one or more DSPs, or one or more field programmable gate arrays (FPGA). For another example, when one of the foregoing modules is implemented in a form of scheduling a program by a processing element, the processing element may be a general purpose processor, for example, a central processing unit (CPU) or another processor that can invoke the program. For still another example, the modules may be integrated together, and implemented in a form of a system-on-a-chip (SOC).

An embodiment of this application further provides a communications apparatus, and the communications apparatus may be a terminal device, or may be a chip in a terminal device. The communications apparatus may be configured to perform an action performed by the terminal device in the foregoing method embodiments.

An embodiment of this application further provides a communications apparatus, and the communications apparatus may be a terminal device or a circuit. The communications apparatus may be configured to perform an action performed by the terminal device in the foregoing method embodiments.

Figure 9:
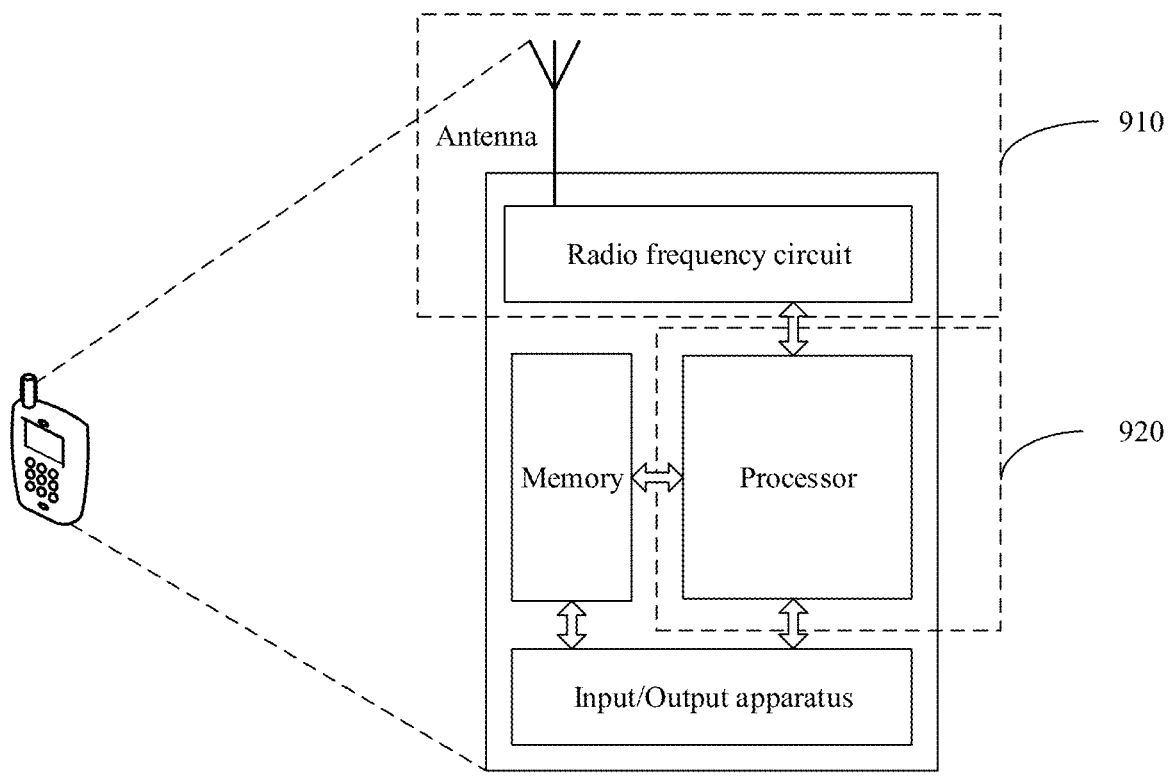
FIG. 9 is a schematic structural diagram of another communications apparatus according to this application.

When the communications apparatus is a terminal device, FIG. 9 is a simplified schematic structural diagram of a terminal device. For ease of understanding and convenience of figure illustration, an example in which the terminal device is a mobile phone is used in FIG. 9. As shown in FIG. 9, the terminal device includes a processor, a memory, a radio frequency circuit, an antenna, and an input/output apparatus. The processor is mainly configured to: process a communications protocol and communication data, control the terminal device, execute a software program, process data of the software program, and the like. The memory is mainly configured to store the software program and the data. The radio frequency circuit is mainly configured to: perform conversion between a baseband signal and a radio frequency signal, and process the radio frequency signal. The antenna is mainly configured to receive and send a radio frequency signal in an electromagnetic wave form. The input/output apparatus, such as a touchscreen, a display screen, and a keyboard, is mainly configured to receive data input by a user and output data to the user. It should be noted that some types of terminal devices may not have the input/output apparatus.

When data needs to be sent, after performing baseband processing on the to-be-sent data, the processor outputs a baseband signal to the radio frequency circuit. After performing radio frequency processing on the baseband signal, the radio frequency circuit sends the radio frequency signal in an electromagnetic wave form via the antenna. When data is sent to the terminal device, the radio frequency circuit receives a radio frequency signal via the antenna, converts the radio frequency signal into a baseband signal, and outputs the baseband signal to the processor. The processor converts the baseband signal into data, and processes the data. For ease of description, FIG. 9 shows only one memory and processor. In an actual terminal device product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna and the radio frequency circuit that have receiving and sending functions may be considered as a transceiver unit of the terminal device, and the processor that has a processing function may be considered as a processing unit of the terminal device. As shown in FIG. 9, the terminal device includes a transceiver unit 910 and a processing unit 920. The transceiver unit may also be referred to as a transceiver, a transceiver machine, a transceiver apparatus, or the like. The processing unit may also be referred to as a processor, a processing board, a processing module, a processing apparatus, or the like. Optionally, a component that is in the transceiver unit 910 and that is configured to implement a receiving function may be considered as a receiving unit, and a component that is in the transceiver unit 910 and that is configured to implement a sending function may be considered as a sending unit. In other words, the transceiver unit 910 includes the receiving unit and the sending unit. The transceiver unit sometimes may also be referred to as a transceiver machine, a transceiver, a transceiver circuit, or the like. The receiving unit may also be sometimes referred to as a receiving machine, a receiver, a receiver circuit, or the like. The sending unit may also be sometimes referred to as a transmitting machine, a transmitter, a transmitter circuit, or the like.

It should be understood that the transceiver unit 910 is configured to perform a sending operation and a receiving operation on a terminal side in the foregoing method embodiments, and the processing unit 920 is configured to perform an operation other than the receiving/sending operation of the terminal device in the foregoing method embodiments.

For example, in an implementation, the transceiver unit 910 is configured to perform the sending operation on the terminal side in S204 in FIG. 2, and/or the transceiver unit 910 is further configured to perform another receiving and sending step on the terminal side in the embodiments of this application. The processing unit 920 is configured to perform the step on the terminal side in S202 in FIG. 2, and/or the processing unit 920 is further configured to perform another processing step on the terminal side in the embodiments of this application.

When the communications apparatus is a chip, the chip includes a transceiver unit and a processing unit. The transceiver unit may be an input/output circuit or a communications interface. The processing unit is a processor, a microprocessor, or an integrated circuit integrated on the chip.

Figure 10:
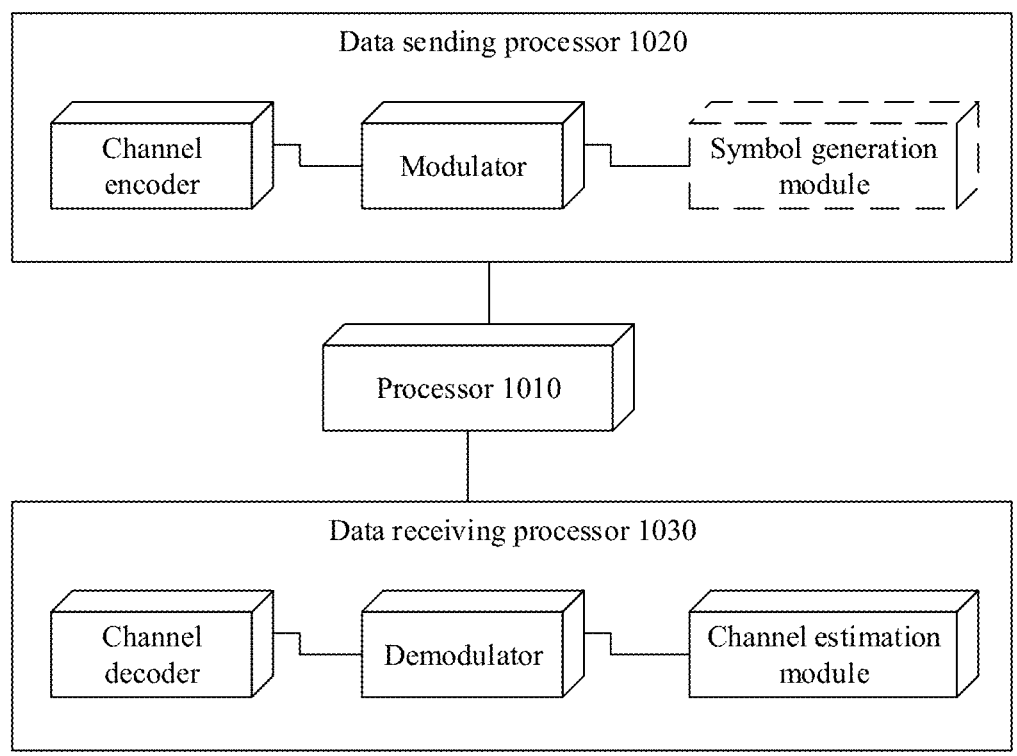
FIG. 10 is a schematic structural diagram of another communications apparatus according to this application.

When the communications apparatus in this embodiment is a terminal device, reference may be made to a device shown in FIG. 10. In an example, the device can implement a function similar to that of the processor 610 in FIG. 6. In FIG. 10, the device includes a processor 1010, a data sending processor 1020, and a data receiving processor 1030. The processor 1010 in the foregoing embodiment may be the processor 1010 in FIG. 10, and completes a corresponding function. The data receiving processor 1030 in the foregoing embodiment may be the data sending processor 1020 and/or the data receiving processor 1030 in FIG. 10. Although FIG. 10 shows a channel encoder and a channel decoder, it may be understood that these modules are merely examples, and do not constitute limitative descriptions of this embodiment.

Figure 11:
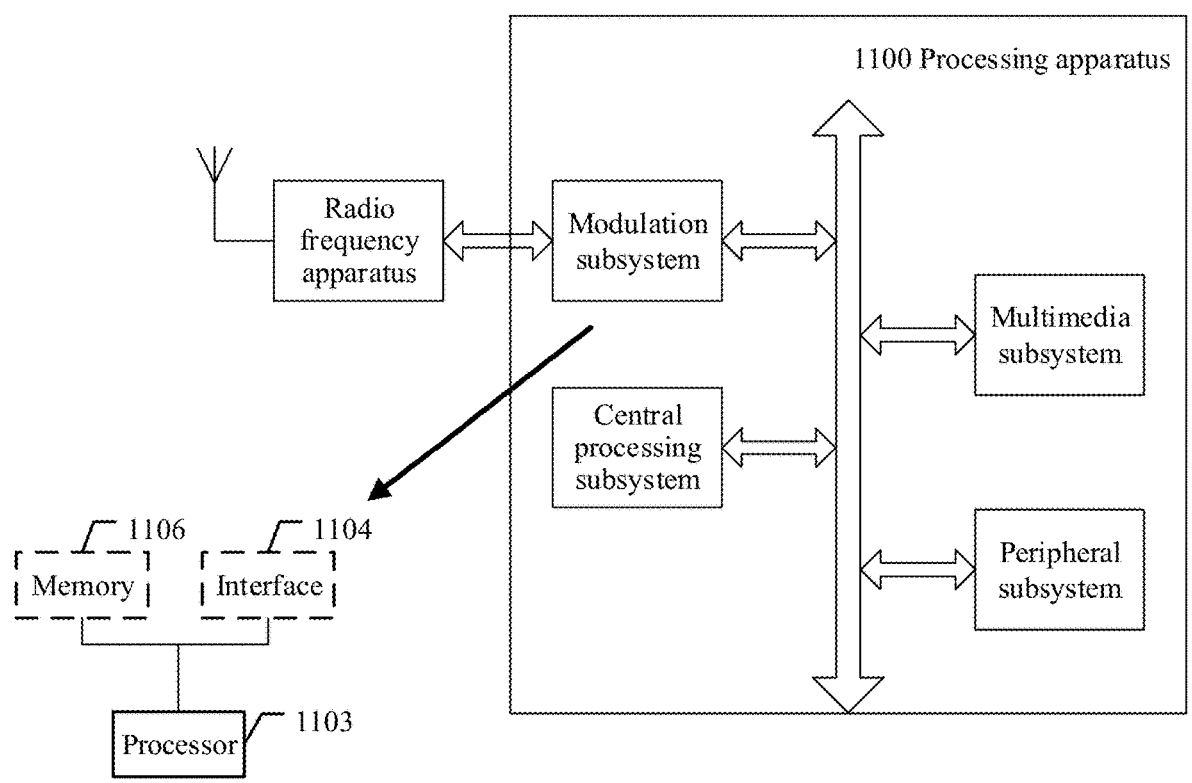
FIG. 11 is a schematic structural diagram of another communications apparatus according to this application.

FIG. 11 shows another form of this embodiment. A processing apparatus 1100 includes modules such as a modulation subsystem, a central processing subsystem, and a peripheral subsystem. The communications apparatus in this embodiment may be used as the modulation subsystem in the processing apparatus 1100. Specifically, the modulation subsystem may include a processor 1103 and an interface 1104. The processor 1103 completes a function of the processor 610, and the interface 1104 completes a function of the transceiver 630. In another variation, the modulation subsystem includes a memory 1106, a processor 1103, and a program that is stored in the memory 1106 and that can be run on the processor. When executing the program, the processor 1103 implements the method on the terminal side in the foregoing method embodiments. It should be noted that the memory 1106 may be nonvolatile or volatile. The memory 1106 may be located in the modulation subsystem, or may be located in the processing apparatus 1100, provided that the memory 1106 can be connected to the processor 1103.

In another form of this embodiment, a computer-readable storage medium is provided. The computer-readable storage medium stores instructions. When the instructions are executed, the method on the terminal side in the foregoing method embodiments is performed.

In another form of this embodiment, a computer program product that includes instructions is provided. When the instructions are executed, the method on the terminal side in the foregoing method embodiments is performed.

In addition, an embodiment of this application further provides a computer-readable storage medium. The computer-readable storage medium stores a computer program. When the computer program is run on a computer, the computer is enabled to perform the precoding matrix indication method in the foregoing embodiments.

In addition, an embodiment of this application further provides a computer program product. The computer program product includes a computer program. When the computer program is run on a computer, the computer is enabled to perform the method in the foregoing embodiments.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to this application are all or partially generated. The computer may be a general-purpose computer, a dedicated computer, a computer network, or another programmable apparatus. The computer instructions may be stored in the computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, such as a server and a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk), or the like.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

The invention claimed is:

1. A precoding matrix indication method for a network device, wherein the method comprises:
    receiving third indication information, wherein the third indication information indicates $W_2^{(1)}, W_2^{(2)}, \ldots,$ and $W_2^{(K)}$, wherein $W^{(k)}$ is a precoding matrix in a $k^{th}$ frequency-domain unit, $W^{(k)}$ satisfies $W^{(k)}=W_1 \times W_2^{(k)}$, $W_1$ is an $N_t \times L$ matrix, $W_2^{(k)}$ is an $L \times R$ matrix, $0 < k \leq K$, and K is a quantity of frequency-domain units, and L and R are integers, wherein the third indication information comprises second indication information, the second indication information indicates $P_{i,j}$ elements in a vector $D_{i,j}$, wherein the vector $D_{i,j}$ and a matrix $F_{i,j}$ satisfy $V_{i,j}=F_{i,j} \times D_{i,j}$, the vector $V_{i,j}$ corresponds to $W_2^{(1)}(i,j), W_2^{(2)}(i,j), \ldots,$ and $W_2^{(K)}(i,j), W_2^{(k)}(i,j)$ is a complex number in an $i^{th}$ row and a $j^{th}$ column of the matrix $W_2^{(k)}$, and $F_{i,j}$ is a $K \times P_{i,j}$ matrix, where $0 < i \leq L$, $0 < j \leq R$, and $P_{i,j} \leq k$; and
    sending downlink data based on the third indication information.

2. The method according to claim 1,
    wherein the third indication information further comprises first indication information;
    the first indication information indicates a quantity of the elements indicated by the second indication information.

3. The method according to claim 1, wherein that the vector $V_{i,j}$ corresponds to $W_2^{(1)}(i,j), W_2^{(2)}(i,j), \ldots,$ and $W_2^{(K)}(i,j)$ comprises:
    $V_{i,j}$ is a column vector including $W_2^{(1)}(i,j), W_2^{(2)}(i,j), \ldots,$ and $W_2^{(K)}(i,j)$; or
    $V_{i,j}$ is a column vector including amplitudes of $W_2^{(1)}(i,j), W_2^{(2)}(i,j), \ldots,$ and $W_2^{(K)}(i,j)$; or
    $V_{i,j}$ is a column vector including phases of $W_2^{(1)}(i,j), W_2^{(2)}(i,j), \ldots,$ and $W_2^{(K)}(i,j)$.

4. The method according to claim 1, wherein the quantity of the elements indicated by the second indication information comprises $\Sigma_{(i,j) \in S} P_{i,j}$ or $\Sigma_{(i,j) \in S}(P_{i,j}-1)$, wherein S is a nonempty subset of a set $\{(x,y)|(x \in \{1,2,\ldots,L\}), y \in \{1,2,\ldots,R\})\}$.

5. The method according to claim 1, wherein $P_{i,j}$ vectors of the matrix $F_{i,j}$ are orthogonal to each other.

6. The method according to claim 1, wherein the method further comprises:
    receiving fifth indication information, wherein the fifth indication information indicates the matrix $F_{i,j}$.

7. The method according to claim 2, wherein the first indication information comprises one or more bitmaps; and
    each bitmap of the one or more bitmaps indicates positions of the $P_{i,j}$ elements in the vector $D_{i,j}$.

8. The method according to claim 2, wherein the third indication information is channel state information (CSI), and the CSI comprises:
    a first part (part 1) CSI, comprising the first indication information, a rank indicator (RI), and a channel quality indicator (CQI) that corresponds to a first codeword; and
    a second part (part 2) CSI, comprising the second indication information, wherein
    the part 1 CSI and the part 2 CSI are independently encoded.

9. A communications apparatus, wherein the communications apparatus comprises:
    at least one processor; and
    one or more memories coupled to the at least one processor and storing programming instructions for execution by the at least one processor to cause the apparatus to:
    receive third indication information, wherein the third indication information indicates $W_2^{(1)}, W_2^{(2)}, \ldots, W_2^{(K)}$, wherein $W^{(k)}$ is a preceding matrix in a $k^{th}$ frequency-domain unit, $W^{(k)}$ satisfies $W^{(k)}=W_1 \times W_2^{(k)}$, $W_1$ is an $N_t \times L$ matrix, $W_2^{(k)}$ is an $L \times R$ matrix, $0 < k \leq K$, and K is a quantity of frequency-domain units, and L and R are integers;
    the third indication information comprises second indication information and first indication information;
    the second indication information indicates $P_{i,j}$ elements in a vector $D_{i,j}$, wherein the vector $D_{i,j}$ and a matrix $F_{i,j}$ satisfy $V_{i,j}=F_{i,j} \times D_{i,j}$, the vector $V_{i,j}$ corresponds to $W_2^{(1)}(i,j), W_2^{(2)}(i,j), \ldots,$ and $W_2^{(K)}(i,j), W_2^{(k)}(i,j)$ is a complex number in an $i^{th}$ row and a $j^{th}$ column of the matrix $W_2^{(k)}$, and $F_{i,j}$ is a $K \times P_{i,j}$ matrix, wherein $0 < i \leq L$, $0 < j \leq R$, and $P_{i,j} < K$; and the first indication information indicates a quantity of the elements indicated by the second indication information; and send downlink data based on t third indication information.

10. The communications apparatus according to claim 9, wherein that the vector $V_{i,u}$ corresponds to $W_2^{(1)}(i,j)$, $W_2^{(2)}(i,j)$, . . . , and $W_2^{(K)}(i,j)$ comprises:

$V_{i,j}$ is a column vector including $W_2^{(1)}(i,j)$, $W_2^{(2)}(i,j)$, . . . , and $W_2^{(K)}(i,j)$; or $V_{i,j}$ is a column vector including amplitudes of $W_2^{(1)}(i,j)$, $W_2^{(2)}(i,j)$, . . . , and $W_2^{(K)}(i,j)$; or $V_{i,j}$ is a column vector including phases of $W_2^{(1)}(i,j)$, $W_2^{(2)}(i,j)$, . . . , and $W_2^{(K)}(i,j)$.

11. The communications apparatus according to claim 9, wherein the quantity of the elements indicated by the second indication information comprises $\Sigma_{(i,j) \in S} P_{i,j}$ or $\Sigma_{(i,j) \in S}(P_{i,j}-1)$, wherein S is a nonempty subset of a set $\{(x, y) | x \in \{1,2, \ldots, L\} y \in \{1,2, \ldots, R\})\}$.

12. The communications apparatus according to claim 9, wherein $P_{i,j}$ vectors of the matrix $F_{i,j}$ are orthogonal to each other.

13. The communications apparatus according to claim 9, wherein the one or more memories store programming instructions for execution by the at least one processor to cause the apparatus to:

receive fifth indication information, wherein the fifth indication information indicates the matrix $F_{i,j}$.

14. The communications apparatus according to claim 9, wherein the first indication information comprises one or more bitmaps; and each bitmap of the one or more bitmaps indicates positions of the $P_{i,j\ 1}$ elements in the vector $D_{i,j}$.

15. The communications apparatus according to claim 9, wherein the third indication information is channel state information (CSI), and the CSI comprises:

a first part (part 1) CSI, comprising the first indication information, a rank indicator (RI), and a channel quality indicator (CQI) that corresponds to a first codeword; and a second part (part 2) CSI, comprising the second indication information, wherein the part 1 CSI and the part 2 CSI are independently encoded.

16. A non-transitory computer-readable storage medium coupled to at least one processor and storing programming instructions for execution by the at least one processor, wherein the programming instructions instruct the at least one processor to:

receive third indication information, wherein the third indication information indicates $W_2^{(1)}$, $W_2^{(2)}$, . . . , and $W_2^{(K)}$, wherein $W^{(k)}$ is a precoding matrix in a $k^{th}$ frequency-domain unit, $W^{(k)}$ satisfies $W^{(k)} = W_1 \times W_2^{(k)}$, $W_1$ is an $N_t \times L$ matrix, $W_2^{(k)}$ is an $L \times R$ matrix, $0 < k \leq K$, and K is a quantity of frequency-domain units, and L and R are integers;

the third indication information comprises second indication information and first indication information;

the second indication information indicates $P_{i,j}$ elements in a vector $D_{i,j}$, wherein the vector $D_{i,j}$ and a matrix $F_{i,j}$ satisfy $V_{i,j} = F_{i,j} \times D_{i,j}$, the vector $V_{i,j}$ corresponds to $W_2^{(1)}(i,j)$, $W_2^{(2)}(i,j)$, . . . , and $W_2^{(k)}$, and $F_{i,j}$ is a $K \times P_{i,j}$ matrix, wherein $0 < i \leq L$, $0 < j \leq R$, and $P_{i,j}K$; and the first indication information indicates a quantity of the elements indicated by the second indication information; and send downlink data based on the third indication information.

17. The non-transitory computer-readable storage medium according to claim 16, wherein that the vector $V_{i,j}$ corresponds to $W_2^{(1)}(i,j)$, $W_2^{(2)}(i,j)$, . . . , and $W_2^{(K)}(i,j)$ comprises:

$V_{i,j}$ is a column vector including $W_2^{(1)}(i,j)$, $W_2^{(2)}(i,j)$, . . . , and $W_2^{(K)}(i,j)$; or $V_{i,j}$ is a column vector including amplitudes of $W_2^{(1)}(i,j)$, $W_2^{(2)}(i,j)$, . . . , and $W_2^{(K)}(i,j)$; or $V_{i,j}$ is a column vector including phases of $W_2^{(1)}(i,j)$, $W_2^{(2)}(i,j)$, . . . , and $W_2^{(K)}(i,j)$.

18. The non-transitory computer-readable storage medium according to claim 16, wherein the quantity of the elements indicated by the second indication information comprises $\Sigma_{(i,j) \in S} P_{i,j}$ or $\Sigma_{(i,j) \in S}(P_{i,j}-1)$, wherein S is a nonempty subset of a set $\{(x,y) | (x \in \{1,2, \ldots, L\}, y \in \{1,2, \ldots, R\})\}$.

19. The non-transitory computer-readable storage medium according to claim 16, wherein $P_{i,j}$ vectors of the matrix $F_{i,j}$ are orthogonal to each other.

20. The non-transitory computer-readable storage medium according to claim 16, wherein the first indication information comprises one or more bitmaps; and each bitmap of the one or more bitmaps indicates positions of the $P_{i,j}$ elements in the vector $D_{i,j}$.

* * * * *

UNITED STATES PATENT AND TRADEMARK OFFICE
CERTIFICATE OF CORRECTION

Page 1 of 2

PATENT NO. : 11,637,599 B2
APPLICATION NO. : 17/512641
DATED : April 25, 2023
INVENTOR(S) : Ruiqi Zhang and Xueru Li It is certified that error appears in the above-identified patent and that said Letters Patent is hereby corrected as shown below:

On the Title Page

Item (56), in OTHER PUBLICATIONS, Line 1, delete "V15.2 0" and insert -- V15.2.0 --.

In the Claims

In Column 36, Line 2, in Claim 1, delete "where" and insert -- wherein --.

In Column 36, Line 3, in Claim 1, delete "$P_{i,j}$<k;" and insert -- $P_{i,j}$<K; --.

In Column 36, Line 8, in Claim 2, after "information;" insert -- and --.

In Column 36, Line 24, in Claim 4, delete "$\Sigma_{(i,j)} \in sP_{i,j}$or" and insert -- $\Sigma_{(i,j)} \in sP_{i,j}$ or --.

In Column 36, Line 25, in Claim 4, delete "L})," and insert -- L}, --.

In Column 36, Line 57, in Claim 9, before "$W2^{(K)}$," insert -- and --.

In Column 36, Line 57, in Claim 9, delete "preceding" and insert -- precoding --.

In Column 36, Line 59, in Claim 9, delete "$N_t$ ×L" and insert -- $N_t$×L --.

In Column 37, Line 7, in Claim 9, delete "on t" and insert -- on the --.

In Column 37, Line 10, in Claim 10, delete "$V_{i,u}$" and insert -- $V_{i,j}$ --.

In Column 37, Line 22, in Claim 11, delete "{(x, y)|x $\in$ {1,2, . . ., L}y $\in$" and insert -- {(x,y)|(x$\in$ {1,2 . . . , L}, y$\in$ --.

Signed and Sealed this
Fourth Day of July, 2023

Katherine Kelly Vidal
*Director of the United States Patent and Trademark Office*

CERTIFICATE OF CORRECTION (continued)
U.S. Pat. No. 11,637,599 B2

In Column 37, Line 36, in Claim 14, delete "₁ elements" and insert -- elements --.

In Column 38, Line 6, in Claim 16, delete "$W^{(K)}$" and insert -- $W^{(k)}$ --.

In Column 38, Line 7, in Claim 16, delete "frequency- domain" and insert -- frequency-domain --.

In Column 38, Line 16, in Claim 16, before "$W_2^{(k)}$," insert -- $W_2^{(K)}(i,j)$, $W_2^{(k)}(i,j)$ is a complex number in an $i^{th}$ row and a $j^{th}$ column of the matrix --.

In Column 38, Line 17, in Claim 16, delete "$P_{i,j}K$;" and insert -- $P_{i,j}<K$; --.

In Column 38, Line 37, in Claim 18, delete "−1) ," and insert -- −1), --.

In Column 38, Line 39, in Claim 18, delete "y ∈ {" and insert -- y∈{ --.